US008122333B2

(12) United States Patent
Shim et al.

(10) Patent No.: US 8,122,333 B2
(45) Date of Patent: Feb. 21, 2012

(54) METHOD OF DETECTING AND ISOLATING FAULT IN REDUNDANT SENSORS, AND METHOD OF ACCOMMODATING FAULT IN REDUNDANT SENSORS USING THE SAME

(75) Inventors: Duk-Sun Shim, Seoul (KR);
Cheol-kwan Yang, Seoul (KR)

(73) Assignee: Chung-An University Industry Academic Cooperation Foundation, Seoul (KR)

( * ) Notice: Subject to any disclaimer, the term of this patent is extended or adjusted under 35 U.S.C. 154(b) by 961 days.

(21) Appl. No.: 12/114,918

(22) Filed: May 5, 2008

(65) Prior Publication Data

US 2008/0276155 A1 Nov. 6, 2008

(30) Foreign Application Priority Data

May 3, 2007 (KR) .................. 10-2007-0043211
May 31, 2007 (KR) .................. 10-2007-0053009

(51) Int. Cl.
*G06F 11/00* (2006.01)
*H03M 13/00* (2006.01)
*G01B 7/00* (2006.01)
*G01B 15/00* (2006.01)

(52) U.S. Cl. ........................ 714/800; 702/155
(58) Field of Classification Search .................. None
See application file for complete search history.

(56) References Cited

U.S. PATENT DOCUMENTS

| 4,965,732 | A | * | 10/1990 | Roy et al. .................. 342/147 |
| 5,105,372 | A | * | 4/1992 | Provost et al. .................. 702/185 |
| 5,345,539 | A | * | 9/1994 | Webb .................. 706/24 |
| 5,661,735 | A | * | 8/1997 | Fischer .................. 714/800 |
| 5,798,942 | A | * | 8/1998 | Danchick et al. .................. 342/96 |
| 6,408,245 | B1 | * | 6/2002 | An et al. .................. 701/216 |
| 7,394,244 | B2 | * | 7/2008 | Schley et al. .................. 324/207.24 |
| 7,937,190 | B2 | * | 5/2011 | Stecko et al. .................. 701/3 |

FOREIGN PATENT DOCUMENTS

JP 08-233620 9/1996

OTHER PUBLICATIONS

Rolf Isermann, Model-Based Fault Detection and Diagnosis -Status and Applications-2004, Institute of Automatic Control, Darmstadt University of Technology, pp. 1-12.*
JPO Office Action corresponding to Application No. 2008-120774, issued Nov. 2, 2010.

* cited by examiner

*Primary Examiner* — Jeffrey A Gaffin
*Assistant Examiner* — Guerrier Merant
(74) *Attorney, Agent, or Firm* — Occhiuti Rohlicek & Tsao LLP

(57) ABSTRACT

Provided are a method of detecting and isolating fault in sensors and a method of accommodating fault in sensors using the same. In the method of detecting and isolating fault in sensors, a one reduced-order parity vector is obtained by excluding the output of one sensor selected from n sensors, a two reduced-order parity vector is obtained by excluding output of two sensors selected from the n sensors, and when there are a plurality of parity vectors obtained at plural points of time, one reduced-order parity vectors are averaged to obtain an averaged one reduced-order parity vector and likewise, two reduced-order parity vectors are averaged to obtain an averaged two reduced-order parity vector. Therefore, a decrease in fault detection and isolation (FDI) performance can be hindered, and even when double faults occur, sensors to be excluded can be selected. Thus, a system including sensors has high reliability and high accuracy.

7 Claims, 20 Drawing Sheets

METHOD OF DETECTING AND ISOLATING FAULT IN REDUNDANT SENSORS, AND METHOD OF ACCOMMODATING FAULT IN REDUNDANT SENSORS USING THE SAME

CROSS-REFERENCE TO RELATED PATENT APPLICATIONS

This application claims the benefit of Korean Patent Application No. 10-2007-0043211, filed on May 3, 2007, and No. 10-2007-0053009, filed on May 31, 2007 in the Korean Intellectual Property Office, the disclosure of which is incorporated herein in its entirety by reference.

BACKGROUND OF THE INVENTION

1. Field of the Invention

The present invention relates to a method of detecting and isolating fault in sensors and a method of accommodating fault in sensors using the same, and more particularly, to a method of detecting and isolating fault in sensors in a system including redundant sensors and a method of accommodating fault in redundant sensors using the same.

2. Description of the Related Art

Many systems such as control, navigation, and communication systems consist of various and complex subunits, and thus the hardware and software structure of those subunits are very complicated. Therefore, the importance of reliability of the whole systems has been increased.

The reliability of the whole systems can be enhanced by improving the reliability of respective subunits. In addition, the fault detection and isolation (FDI) can also ensure the reliability of the whole systems.

The terminology "fault" refers to an unexpected change occurring in a system, which degrades the performance of the whole system; the terminology "fault detection" refers to the indication that something is going wrong in the system; the terminology "fault isolation" refers to the determination of the exact location of the fault; the terminology "fault identification" refers to the determination of the magnitude and type or nature of the fault; and the terminology "fault accommodation" refers to the reconfiguration of the system using healthy components.

The fault can occur in any part of the whole system, and thus, the reliability of the whole system can be enhanced by securing the normal procedure of the whole system even when fault occurs in some of the whole system, which can be further described using the concept of "redundancy." The redundancy refers to the duplicating of elements or means for performing required functions so as to secure the reliability of the whole system even when some of the elements or means are broken up. The redundancy is categorized into a physical redundancy (direct redundancy or hardware redundancy) and an analytical redundancy (functional redundancy). Thus, FDI are categorized into FDI using hardware redundancy and FDI using analytical redundancy.

For hardware redundancy, more sensors than required at the minimum are used. For example, two or more sensors are used to obtain a scalar variable, and four or more sensors are used to obtain a vector variable. Therefore, to obtain the hardware redundancy, redundant sensors are required and thus, the manufacturing costs are increased and the system is physically increased in size.

For analytical redundancy, additional information is obtained from the mathematical model of a system. This type of redundancy is based on the idea that inherent redundancy exists in a unique dynamic relationship between inputs and outputs of the system model. The FDI method using the analytical redundancy is complex on theory because there is a need to obtain the mathematical relationship between a plurality of sensors for measuring various physical values, and in most cases, redundant hardware is necessarily required.

For example, the inertial navigation system (INS), which is widely used in aerospace systems, uses redundant sensors for hardware redundancy. Although common INS uses three accelerometers and three gyroscopes to calculate navigation information such as position, velocity and altitude, redundant sensors are used to obtain reliability and to enhance navigation accuracy.

In a conventional FDI applied in the INS, fault is detected and isolated by comparing the information from redundant sensors, and specifically, the parity equation generation, fault detection, and fault isolation are sequentially performed. In addition, if possible, the system can be reconfigured using only the other sensors, excluding faulty sensors, which is a fault accommodation procedure.

The parity equation is obtained using either a vector of a null space of the measurement matrix to be independent from input values (angular velocity, acceleration velocity), or a residual. The obtained parity equation is compared with a predetermined threshold to detect and isolate fault. A lot of studies on FDI methods have been performed so far to produce parity equation through various methods, and a fault detection and isolation method is determined according to the structure of parity equation. Examples of a conventional FDI method include a look-up table method, a squared error method, a generalized likelihood ratio test (GLT), an optimal parity vector test (OPT), sequential FDI, and a singular value decomposition method.

Meanwhile, among parameters for determining the performance of FDI, critical parameters are fault detection probability, correct isolation probability, and wrong isolation probability. FIG. 1 illustrates parameters used to show the performance of a conventional FDI. As the probability of false alarm or the probability of miss detection is increased, the performed of FDI is degraded, in which the false alarm refers to the case that although there is no fault in fact in the system, fault detection is issued, and the miss detection refers to the case that although there is fault in fact, the fault is not detected. However, a high-performance FDI can be defined that even when fault occurs in the system and thus the fault is duly detected, only such sensors having the magnitude of fault greater than a predetermined level, that is, sensors outputting a fault signal of a predetermined threshold value (hereinafter, referred to as 'exclusion threshold value') or greater are isolated. Such selective isolation is required because more sensors should be used to improve a degree of accuracy of the whole system. That is, the high-performance FDI is required to have a high fault detection probability in a fault detection procedure, and a high correct isolation probability and a low wrong isolation probability in a fault isolation procedure.

However, a conventional FDI shows high performances when a relatively high fault signal occurs, but low performances when a relatively low fault signal occurs. This is because when a small exclusion threshold value is used to detect and isolate a fault signal, a false alarm probability and a wrong isolation probability increases. The conventional FDI determines an exclusion threshold value using only one parity equation to minimize the false alarm probability. In this case, however, the exclusion threshold value can be largely affected by measurement noises and thus as long as the measurement noises are not removed, the exclusion threshold value is inaccurate.

Also, the most of conventional FDI methods only focus on a single sensor fault. That is, a plurality of sensors faults, that is, double faults are not considered at all, or the double faults isolation performance on double faults is poor.

SUMMARY OF THE INVENTION

The present invention provides a method of detecting, isolating, and accommodating fault in sensors, in which the probability of fault isolation is high even when a fault signal is low.

The present invention also provides a method of detecting, isolating, and accommodating fault in sensors, in which faulty sensors are selectively excluded when double faults occur so as to improve the accuracy and reliability of the whole system.

According to an aspect of the present invention, there is provided a method of detecting and isolating fault in sensors, the method including: obtaining n−1 first reduced-order parity vectors by sequentially excluding one sensor output among n sensors which are each independently geometrically configured; obtaining $nC_2$ cases of second reduced-order parity vectors by sequentially excluding two sensor outputs among the n sensors; averaging the first reduced-order parity vectors obtained at plural points of time and the second reduced-order parity vectors obtained at plural points of time to obtain an averaged first reduced-order parity vector and an averaged second reduced-order parity vector, respectively; obtaining a first fault detection function by multiplying the averaged first reduced-order parity vector by transpose of the averaged first reduced-order parity vector; obtaining a second fault detection function by multiplying the averaged second reduced-order parity vector by transpose of the averaged second reduced-order parity vector, and determining that at least one sensor selected from the n sensors has fault if the maximum value of the obtained first fault detection function of the n sensors is equal to or greater than a first threshold value which has been set in advance.

According to another aspect of the present invention, there is provided method of accommodating fault in sensors, the method including: detecting fault in sensors which are each independently geometrically configured; when it is determined there are faulty sensors, isolating faulty sensors so that the location of the faulty sensors is identified; and determining sensors to be excluded among the faulty sensors by calculating a first covariance matrix comprising a plurality of faulty sensor outputs, a second covariance matrix excluding one faulty sensor output, and a third covariance matrix excluding all of the faulty sensor outputs, with respect to $\hat{x}=[\hat{x}_x\ \hat{x}_y\ \hat{x}_z]^T$ that is a triad solution of the measurement equation for n sensors m=Hx+f+ϵ, ϵ~N($0_n$, $\sigma I_n$); and comparing traces of the first, second, and third covariance matrices.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A system for detecting and isolating double faults in sensors according to the present invention and a method of detecting and isolating double faults in sensors according to the present will now be described more fully with reference to the accompanying drawings, in which exemplary embodiments of the invention are shown.

Figure 1:
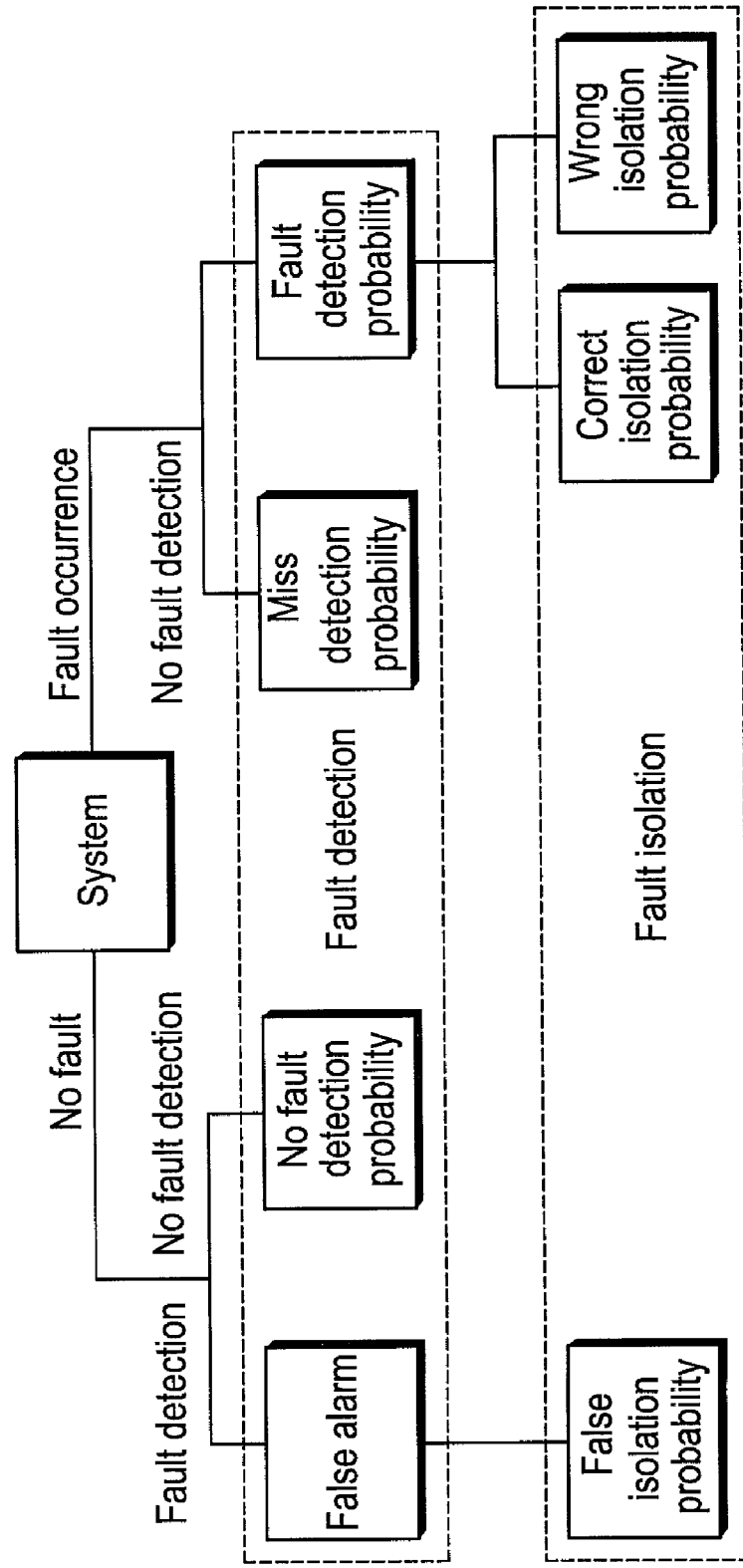
FIG. 1 is a schematic block diagram illustrating parameters used to show the performance of a conventional FDI.

FIG. 1 is a flow chart illustrating a method of detecting and isolating double faults in sensors according to the present inventions.

Following assumptions are used for the current embodiment to detect and isolate faults in sensors.

Assumption 1: n sensors are used and the input axes of any 3 sensors are not on the same plane. That is, N sensors each independently are geometrically configured.

Assumption 2: sensors of equivalent kind (accelerometers and gyroscopes) have identical noise characteristics, where the noise are white noise of which measurement have normal distribution of the same standard deviation, and the noise characteristics are defined as $\epsilon(t)=[\epsilon_1,\epsilon_2,\ldots,\epsilon_n]R^n$, $\epsilon_i(t)\sim N(0,\sigma)$.

As for inertial navigation systems that use a plurality of inertial sensors, that is, three or more gyroscopes and three accelerometers, a typical measurement equation for the redundant inertial sensors of one kind can be described as follows:

$$m(t)=Hx(t)+f(t)+\epsilon(t) \quad [\text{Equation 1}]$$

where m denotes an inertial sensor measurement and is defined as $m=[m_1, m_2, \ldots, m_n]^T \in R^n$, H denotes n×3 measurement matrix with rank $(H^T)=3$ and is defined as $H=[h_1, h_2, \ldots, h_m]^T$, x(t) denotes triad-solution of acceleration or angular rate and is defined as $x(t) \in R^3$, f(t) denotes a fault signal vector and is defined as $f(t)=[f_1, f_2, \ldots, f_n]^T \in R^n$, and $\epsilon(t)$ denotes measurement noise vector and is defined as $\epsilon(t)=[\epsilon_1,\epsilon_2,\ldots,\epsilon_m]^T \in R^n$.

A parity vector p(t) is obtained by multiplying Equation 1 by a parity matrix V.

$$p(t)=Vm(t)=Vf(t)+V\epsilon(t) \quad [\text{Equation 2}]$$

where the parity matrix V satisfies the following conditions.

$$VH=0, VV^T=I_n, \text{ and}$$

$$V=[V_1, V_2, \ldots, V_n], |v_i|=1 (i=1, \ldots, n)$$

The parity matrix V can be obtained by singular value decomposition.

According to Equation 2, it can be seen that the parity vector is largely affected by not only the fault signal but also measurement noises. Therefore, when the magnitude of a fault signal to be detected is low, a conventional FDI using a single parity vector has low detection probability. In addition, when a faulty sensor is isolated, the parity vector is projected to column vectors of the V matrix and the obtained value of the projected parity vector is used. However, such values also are largely affected by measurement noises and thus, the correct isolation probability is decreased.

Meanwhile, measurement matrix H can be decomposed into the multiply value of three matrices according to singular value decomposition as follows:

$$H=U\Lambda\Gamma^* \quad [\text{Equation 3}]$$

where ( )* denotes complex conjugate transpose, $$U = [U_1 : U_2], \Lambda = \begin{bmatrix} \sum \\ 0_{(n-3)\times 3} \end{bmatrix}, \Gamma = I_3, U_1 \in R^{n\times 3}, U_2 \in R^{n\times 3},$$

$$\sum \in R3\times 3,$$

and

U is a unitary matrix.

Since $U_2^T H=0$, a parity matrix V satisfying VH=0 is given by:

$$V=U_2^T (\in R^{(n-3)\times n}) \quad [\text{Equation 4}]$$

A first reduced-order parity vector is a parity vector generated by sequentially excluding sensor outputs one by one among n sensors. When $m_{-i}$ that is a measurement vector excluding i-th sensor output is $[m_1, m_2, \ldots, m_{i-1}, m_{i+1}, \ldots, m_n]^T$, the first reduced-order parity vector $P_{-i}$ is obtained as follows (S101):

$$P_{-i}=V_{-i}m_{-i} \quad [\text{Equation 5}]$$

where $V_{-i}$ denotes (n−4)×(n−1) parity matrix corresponding to $H_{-i}$ where $H_{-i}$ denotes (n−1)×3 measurement matrix corresponding to $m_i$, and $V_{-i}$ and $H_{-i}$ satisfy $V_{-i}V_{-i}^T=I$ and $V_{-i}H_{-i}=0$.

Also, when measurement vector $m_{-i,-j}$ that is a measurement vector excluding i-th sensor and j-th sensor is $[m_1, m_2, \ldots, m_{i-1}, m_{i+1}, \ldots, m_{j-1}, m_{j+1}, \ldots, m_n]^T$, a second reduced-order parity vector $P_{-i,-j}$ is obtained as follows (S111).

$$P_{-i,-j}=V_{-i,-j}m_{-i,-j} \quad [\text{Equation 6}]$$

where $V_{-i,-j}$ denotes (n−5)×(n−2) parity matrix corresponding to $H_{-i,-j}$ where $H_{-i,-j}$ denotes (n−1)×3 measurement matrix corresponding to $m_{-i,-j}$, wherein $V_{-i,-j}$ and $H_{-i,-j}$ satisfy $V_{-i,-j}V_{-i,-j}^T=I$ and $V_{-i,-j}H_{-i,-j}=0$.

Meanwhile, to reduce the effect of the measurement noise $\epsilon(t)$, parity vectors for q samples from a time period of from $t=t_{k-q+1}$ to $t=t_k$ are calculated and then the average of the measured parity vectors for q samples is obtained as follows:

$$\bar{p} \equiv \frac{1}{q}\{p(t_{k-q+1}) + p(t_{k-q+2}) + \ldots + p(t_k)\} \quad [\text{Equation 7}]$$

As described above, it can be seen that the effect of the measurement noise can be ignored when parity vectors for q samples for a predetermined time period are calculated and then the average of the parity vectors is obtained. Therefore, by applying Equation 7 to Equations 5 and 6 to obtain the parity vectors for q samples and averaging the parity vectors, the averaged value of the first reduced-order parity vector and the second reduced-order parity vector, that is to say the averaged first reduced-order parity vector and the averaged first reduced-order parity vector respectively, can be obtained (S102) (S112).

A first fault detection function is defined as a multiply value of the averaged first reduced-order parity vector and transpose thereof (S103). The first fault detection functions are obtained to each of n sensors and then the maximum value of the first fault detection functions is compared to a first threshold value which has been set in advance. When the maximum value is equal to or greater than the first threshold value, it is determined that at least one sensor has fault (S104).

This is given by:

$$F = \max_i \{\bar{p}_{-i}^T \bar{p}_{-i} : i = 1, \ldots, n\}, F \underset{H_0}{\overset{H_1}{\gtrless}} Th_1 \quad [\text{Equation 8}]$$

where

F denotes a fault detection function, $H_1$ denotes a fault hypothesis, $H_0$ denotes a no-fault hypothesis, and $Th_1$ denotes the first threshold value determined from the probability of false alarm with $X^2$ distribution.

If $H_0$ results in a decision of no fault, the method of detecting and isolating fault in sensors according to the present invention can be terminated and all of the following procedures are not performed. That is, if it is determined that no fault occurs in n sensors (S104), fault detection is complete.

Meanwhile, when fault isolation should continue, a minimum value of the first fault detection function is compared to a second threshold value which has been set in advance (S105). When the minimum value of the first fault detection function is smaller than the second threshold value, it is determined that a single fault occurs (S106). On the other hand, when the first fault detection function is equal to or greater than the second threshold value, it is determined that double faults occur (S107). This procedure is performed by comparing S obtained through the following equation with the second threshold value $Th_2$:

$$S = \min_i \{\overline{p}^T_{-i}\overline{p}_{-i} : i, j = 1, \ldots, n\} \qquad \text{[Equation 9]}$$

If $S<Th_2$, it is determined that a single fault occurs and a single fault isolation procedure is performed (S106). On the other hand, if $S \geq Th_2$, it is determined that the occurred fault is not a single fault and a double faults isolation procedure is performed (S107).

When it is determined that a single fault occurs, a sensor that corresponds to a parameter of the averaged first reduced-order parity vector that makes the first fault detection function to have the minimum value is determined as a faulty sensor (S108). Therefore, the faulty sensor is isolated. In (S108), the k-th sensor is isolated, wherein k is given by:

$$k = \underset{i}{\operatorname{argmin}} \{\overline{p}^T_{-i}\overline{p}_{-i} : i = 1, \ldots, n\} \qquad \text{[Equation 10]}$$

Figure 2:
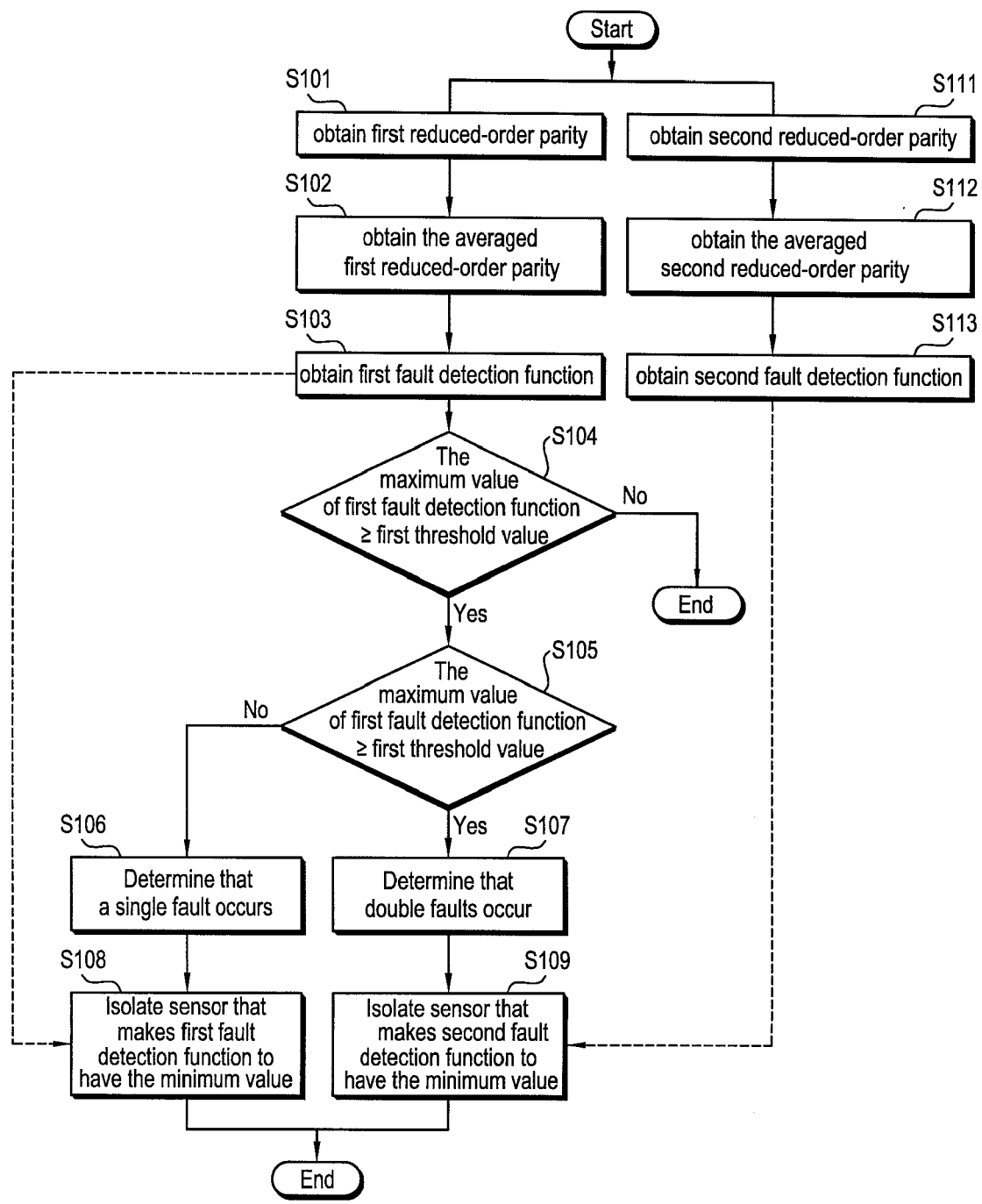
FIG. 2 is a flow chart illustrating a method of detecting, isolating, and accommodating fault in sensors according to an embodiment of the present invention.

When it is determined that double faults occur (S107), a second fault detection function defined by a multiply value of $_nC_2$ averaged second reduced-order parity vectors generated by sequentially excluding two sensors among n sensors and a transpose thereof is calculated (S113), and then sensors which correspond to a parameter of the averaged second reduced-order parity vector which makes the second fault detection function to have the minimum value are determined as faulty sensors (S109). Then, two sensors are isolated as faulty sensors. In FIG. 2, the dotted arrow indicates a pathway for information use, not a flow of each procedure.

This step (S109) is a step isolating the k-th and l-th sensors, which have been determined by the following equation, $$(k, l) = \underset{i,j}{\operatorname{argmin}} \{\overline{p}^T_{-i,-j}\overline{p}_{-i,-j} : i, j = 1, \ldots, n(i \neq j)\} \qquad \text{[Equation 11]}$$

Such isolation of a faulty sensor is based on the concept that when faults occur, the magnitude of the reduced-order parity vector obtained from omitting the faulty measurement should have minimum value. Suppose i-th and j-th components have faults. If n=6, $V_{-i,-j}$ is 1×4 matrix and $p_{-i,-j}$ is a scalar. Therefore, $p_{-i,-j}$ may be zero for some particular faults. If $n \geq 7$, $p_{-i,-j}$ is a non-zero vector, which results in $p^T_{-i,-j} p_{-i,-j} > 0$. Therefore, the minimum number of sensors should be 7 to use a method of detecting and isolating double faults in sensors according to the present invention.

The method of detecting and isolating fault in sensors according to the present invention is suitable for detecting "the fault type 3" and "the fault type 4" introduced in a reference titled "Fault Detection and Isolation Considering Double Faults of Inertial Sensor," *International Journal of Control, Automation, and System*, January 2004", in which the fault type 3 is the case that the magnitudes of two faults are bigger than the fault threshold, but the sum is smaller than the fault threshold and the fault type 4 is the case that that the magnitudes of two faults are smaller than the fault threshold, but the sum is greater than the fault threshold. In this regard, in the case of "the fault type 4," the method of detecting and isolating fault in sensors according to the present invention detects the bigger one as a fault. If the directions of two faults are identical, then a fault-candidate with a magnitude half that of the fault threshold would be decided as a fault. A conventional technique uses Equation 12 as a condition for fault detection and thus, a specific type of fault, that is, "fault type 3" in which the magnitude of respective faults is greater than the threshold value but the sum is smaller than the threshold value, may not be detected:

$$F = \max_i \{p^T p : i = 1, \ldots, n\} > Th_1 \qquad \text{[Equation 12]}$$

Unlike the conventional technique, the method of detecting and isolating fault in sensors according to the present invention uses a fault detection condition, that is, Equation 8 in which sensors are omitted one by one and a maximum value is detected. Therefore, the method is suitable for detecting such specific type of fault.

Figure 3:
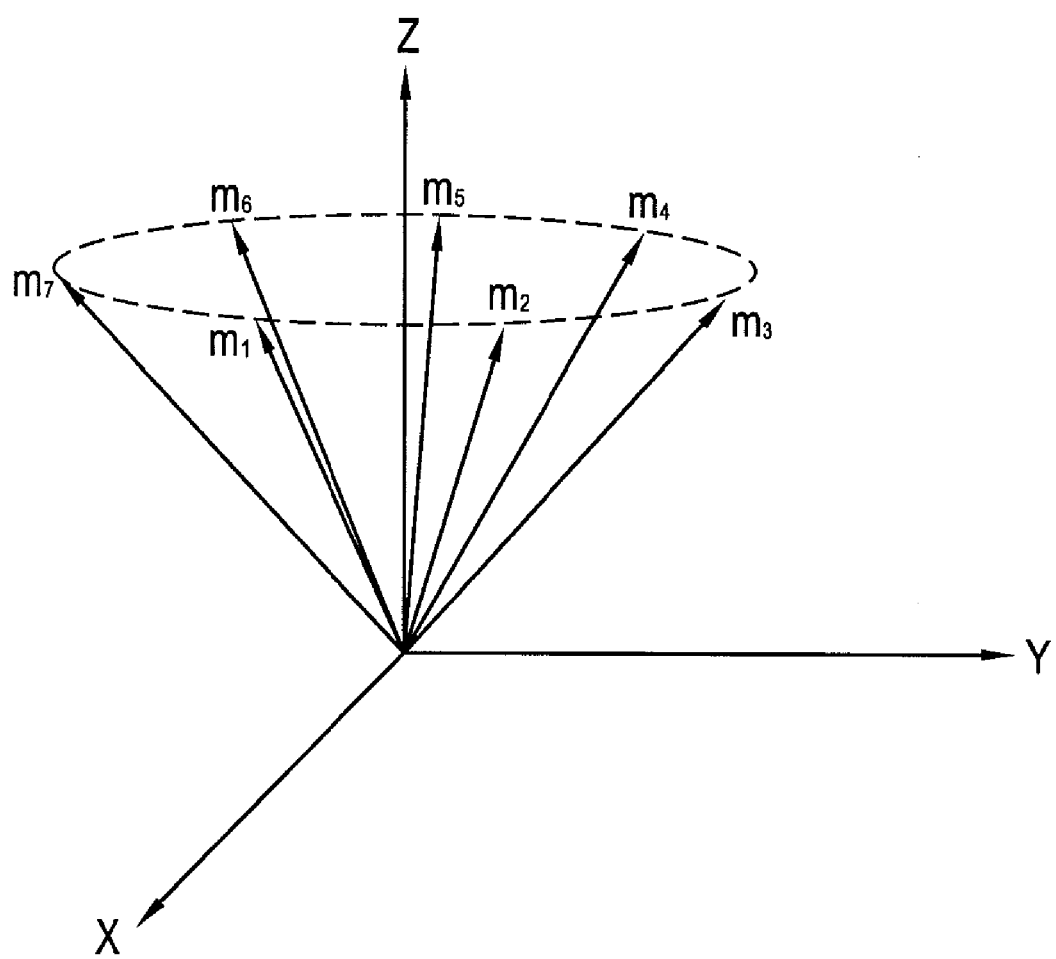
FIG. 3 is a schematic view illustrating the magnitude and angle of seven sensors with a cone configuration.

FIG. 3 is a schematic view illustrating the magnitude and angle of seven sensors with cone configuration. Referring to FIG. 3, the smallest angle in the angles between adjacent sensors is 66.6°. Thus, for the worst case, a fault-candidate with a magnitude 0.598 times of the fault threshold may be decided as a fault.

The measurement matrix H of the sensors with the cone configuration illustrated in FIG. 3 is given by:

$$H = \begin{bmatrix} 0.7071 & 0 & 0.7071 \\ 0.4409 & 0.5528 & 0.7071 \\ -0.1573 & 0.6894 & 0.7071 \\ -0.6371 & 0.3068 & 0.7071 \\ -0.6371 & -0.3068 & 0.7071 \\ -0.1573 & -0.6894 & 0.7071 \\ -0.4409 & -0.5528 & 0.7071 \end{bmatrix}$$

Figure 4:
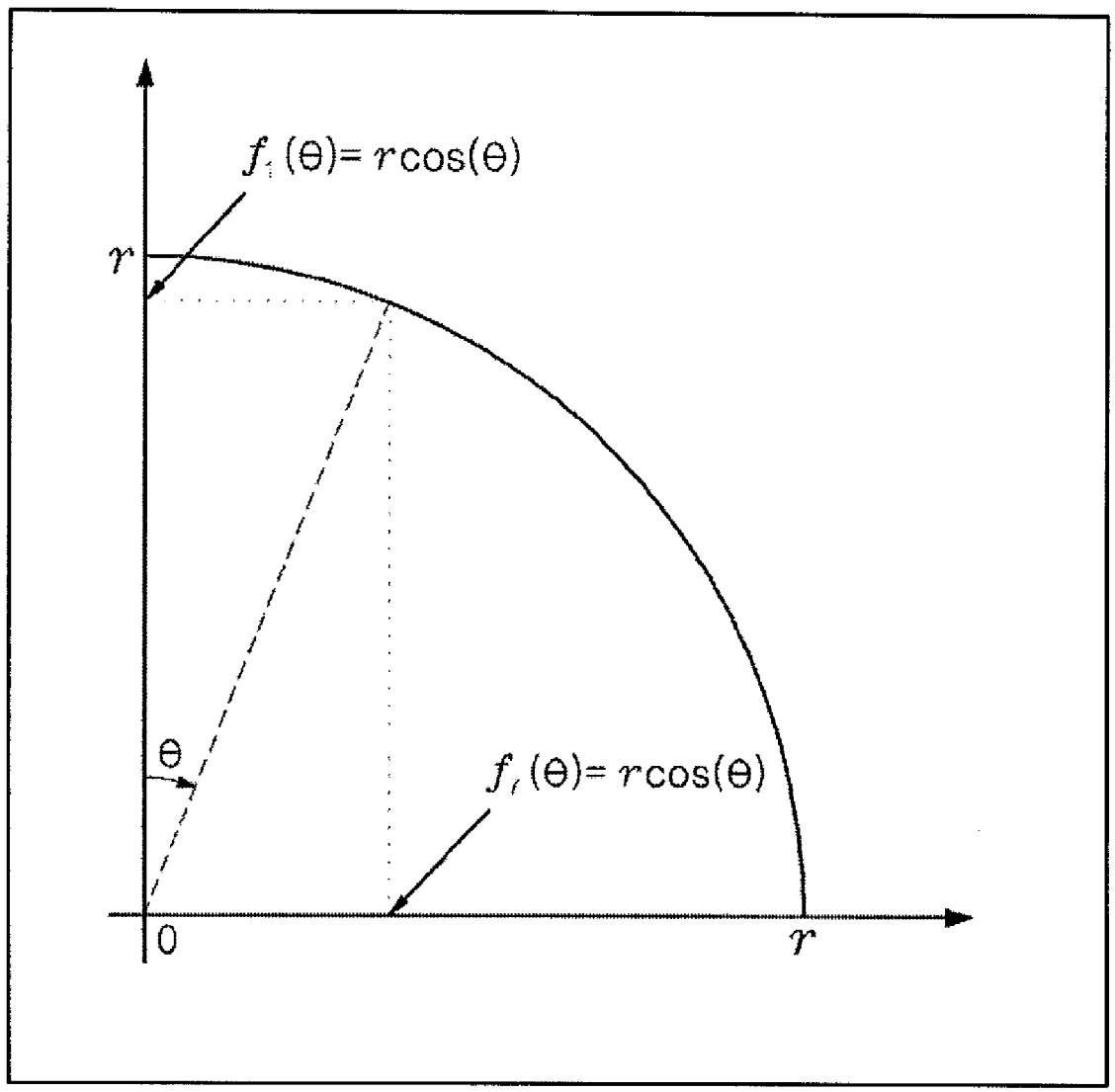
FIG. 4 is a schematic view illustrating the magnitude and included angle (θ) of sensor 1 and sensor 7 which have the configuration illustrated in FIG. 3.

This experiment was performed using 100 samples to obtain averaged parity vectors. To take as many cases as possible into consideration, the magnitude of fault vectors was 2σ, 4σ and 6σ where 1σ is the standard deviation of the sensor noise. Under the assumption that sensor 1 and sensor 7 have fault, the performance of the method of detecting and isolating double faults in sensors according to the present invention was analyzed by performing simulation for many difference values of sensor 1 and sensor 7. For each fixed points on the circle of radius of r, Monte Carlo simulation is performed 300 times for each combination of sensor 1 and sensor 7. FIG. 4 is a schematic view illustrating the magnitude and included angle (θ) of sensor 1 and sensor 7 which have the configuration illustrated in FIG. 3. As the included angle (θ) between sensor 1 and sensor 7 increases, the magnitude of sensor 1 ($f_1$) decreases and the magnitude of sensor 7 ($f_7$) increases.

Figure 5:
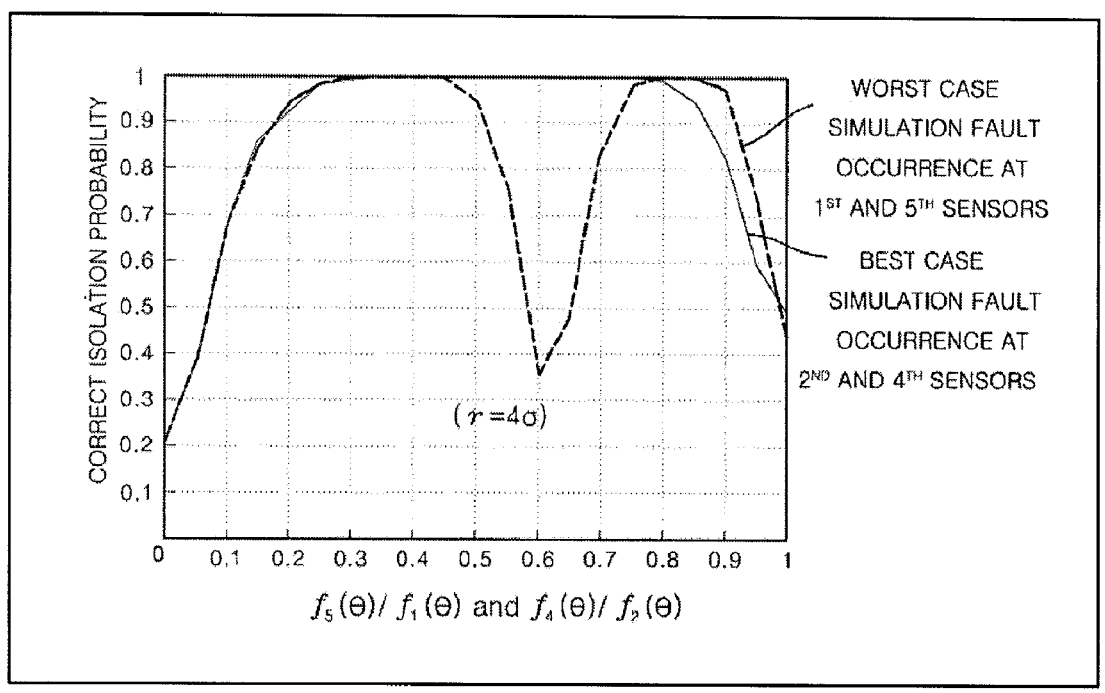
FIG. 5 shows a graph of the probability of correct isolation when the angle θ between sensor 1 and sensor 7 exists between 0° and 45° and a singular value decomposition is applied to a fault vector having the magnitude of 4σ.

Meanwhile, it is known that double faults detection and isolation cannot be performed with 6 sensors. This means that any algorithm cannot show good performance for all combinations of fault sizes between two faults. For example, FIG. 5 indicates the correct isolation probability when the included angle (θ) between sensor 1 and sensor 7 exists between 0° and 45° and the singular value decomposition (SVD) method is applied to fault vectors having the magnitude of 2σ, 4σ and 6σ. Even for the best case as the bold line in FIG. 5, the correct isolation probability becomes 0.5 as the ratio of $f_4/f_2$ goes to 1.

Figure 6:
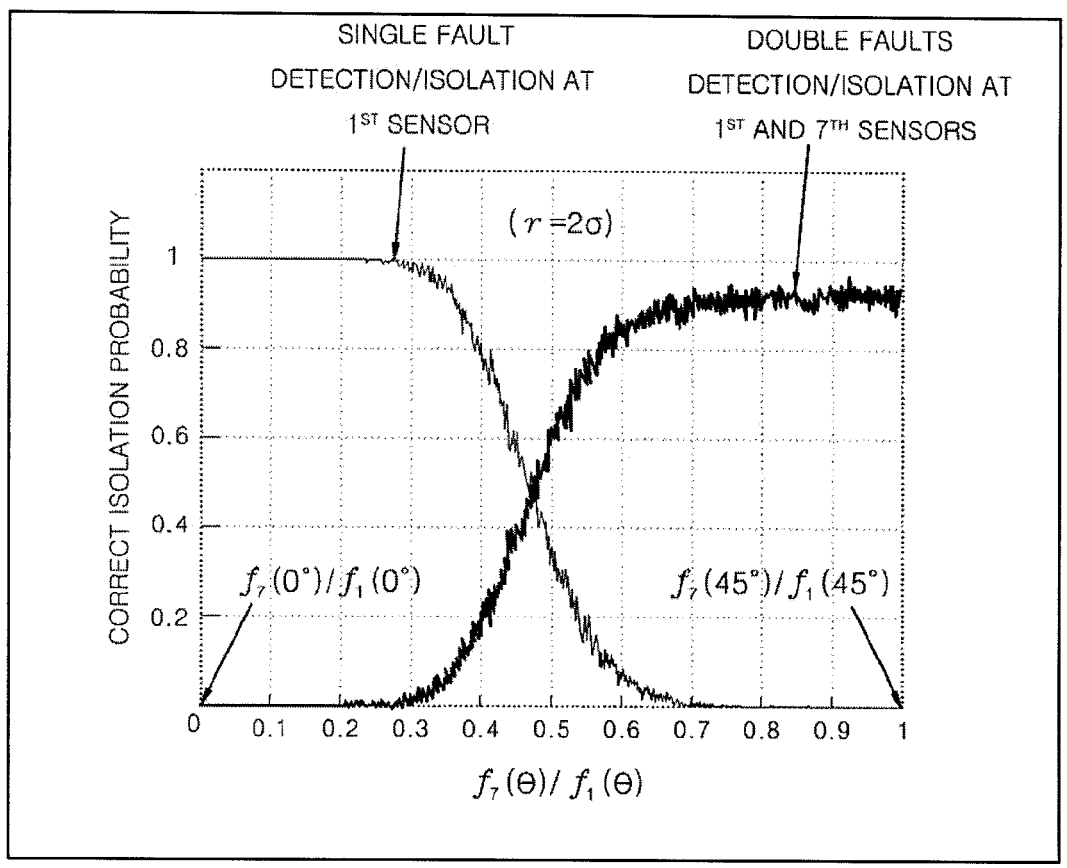
FIGS. 6-8 are graphs illustrating the performance of a method of detecting, isolating, and accommodating fault in sensors according to the present invention when the angle θ between sensor 1 and sensor 7 exists between 0° and 45° and the magnitude of fault vector is 2σ, 4σ and 6σ, respectively.
Figure 7:
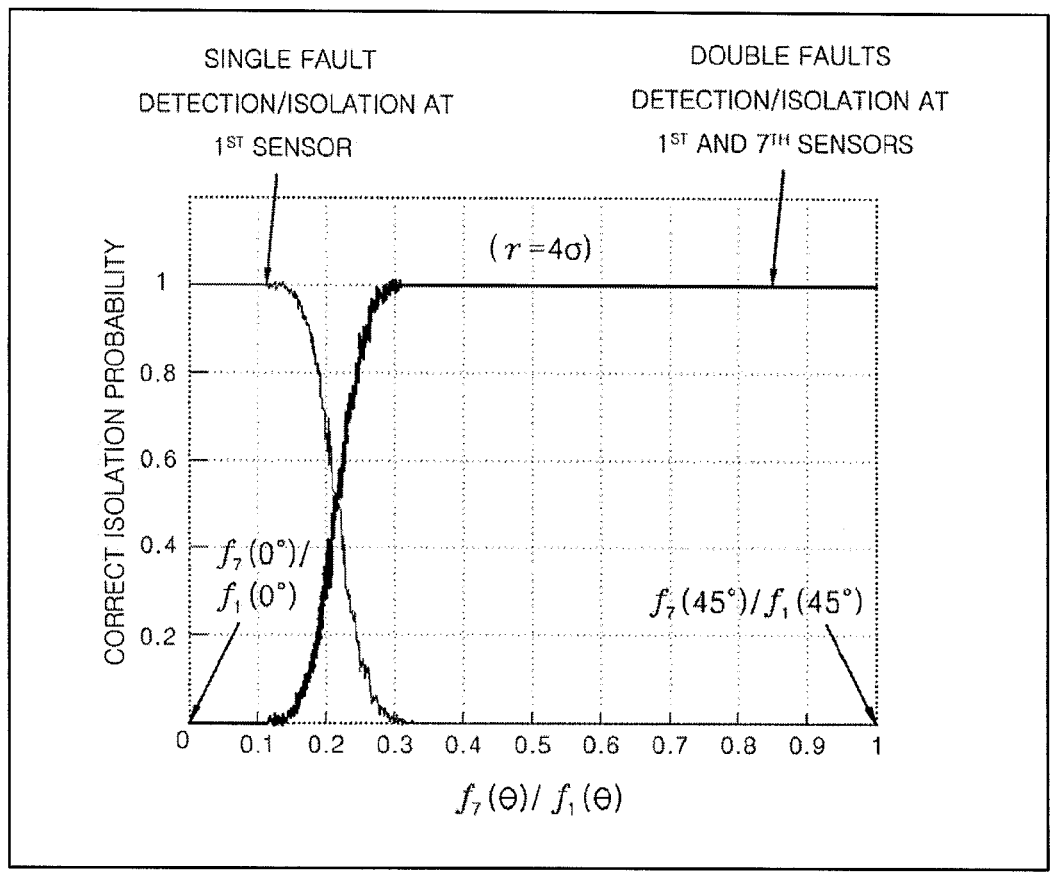
Figure 8:
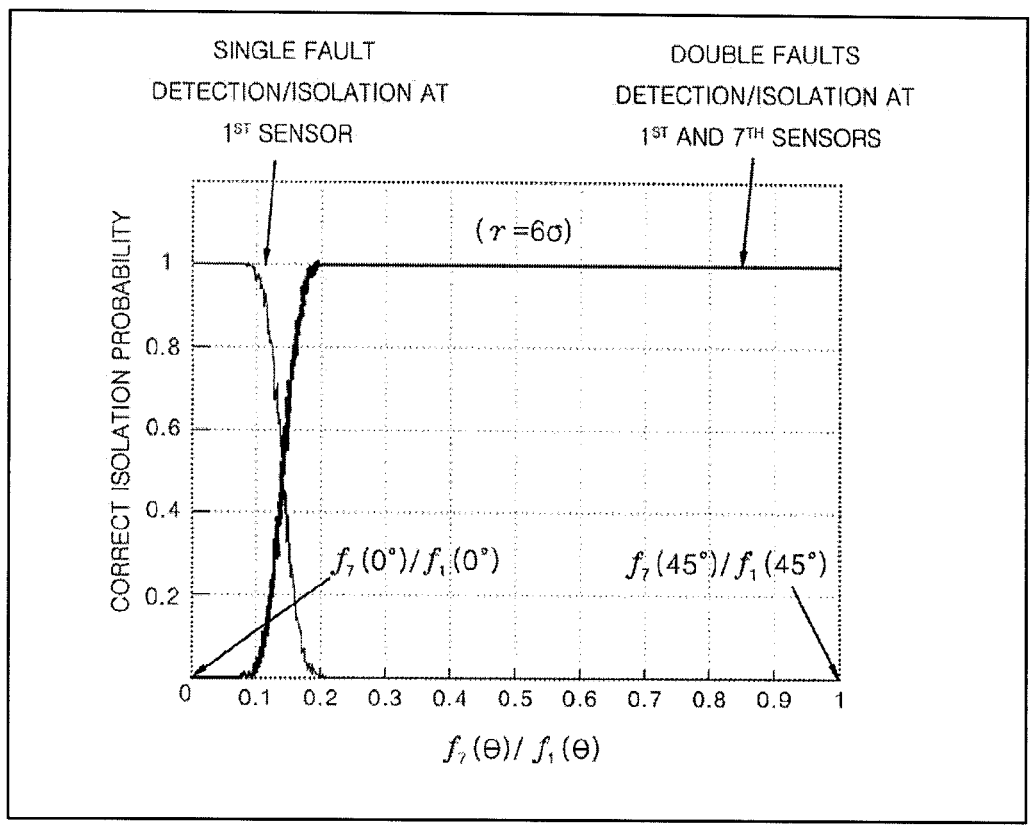

FIGS. 6-8 illustrates the performance of the method of detecting and isolating fault in sensors according to the present invention when the included angle (θ) between sensor 1 and sensor 7 exists between 0° and 45° and the magnitude of fault vector is 2σ, 4σ and 6σ, respectively. In FIGS. 6-8, the bold line indicates that two sensors having fault are detected and isolated.

Figure 9:
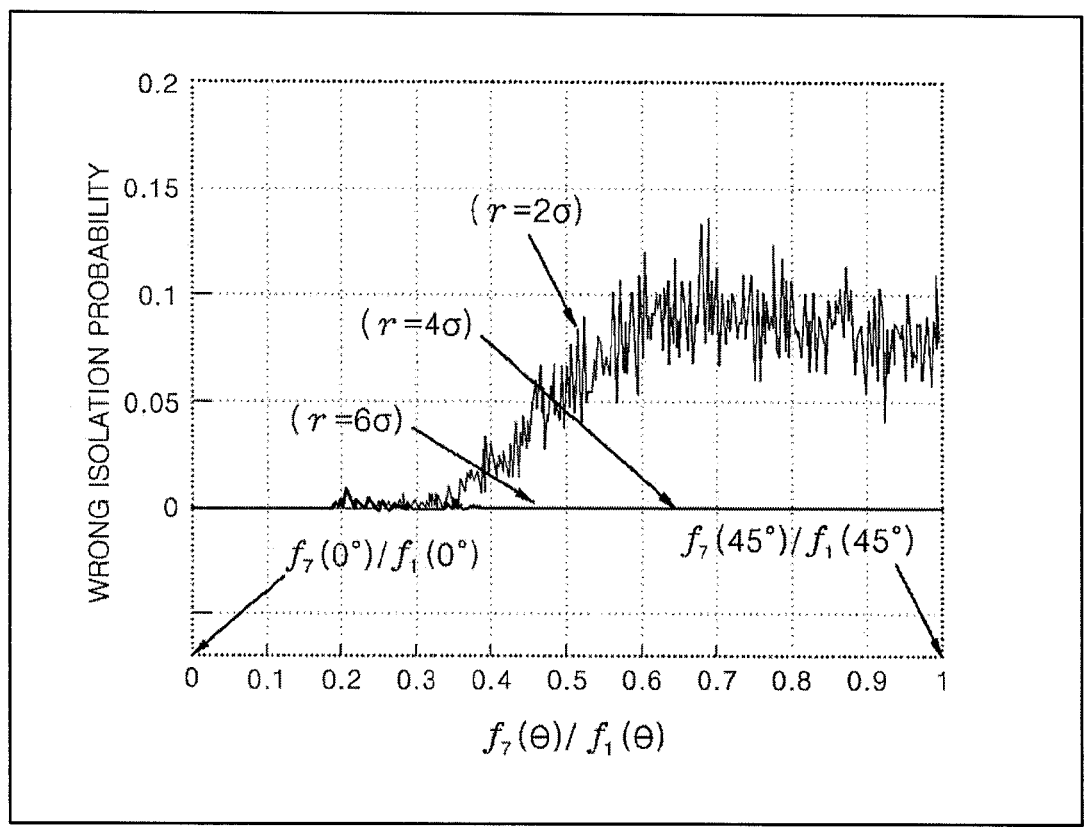
FIG. 9 shows a graph of the probability of wrong isolation of a method of detecting and isolating fault in sensors according to the present invention when double faults occur.

Referring to FIGS. 6-8, when the magnitude of sensor 7 is smaller than the magnitude of sensor 1, the method of detecting and isolating fault in sensors according to the present invention decides that only sensor 1 has fault. As the magnitude of sensor 7 get larger, the method decides that two sensors have fault. As the radius of fault size gets larger, the correct isolation probability becomes 1. Even when the ratio of sensor 1 and sensor 7 lies in the transitive region, at least one fault can be isolated using the method of detecting and isolating fault in sensors according to the present invention, which can be seen from wrong isolation probability described in FIG. 9. If the magnitude of the fault vector is greater than or equal to 4σ, the wrong isolation probability is almost 0 even for the transition region. Also, the simulation result shows that the fault detection probability of the method of detecting and isolating fault in sensors according to the present invention is almost 1.

A method of accommodating fault in sensors according to various embodiments of the present invention will now be described in detail.

Figure 10:
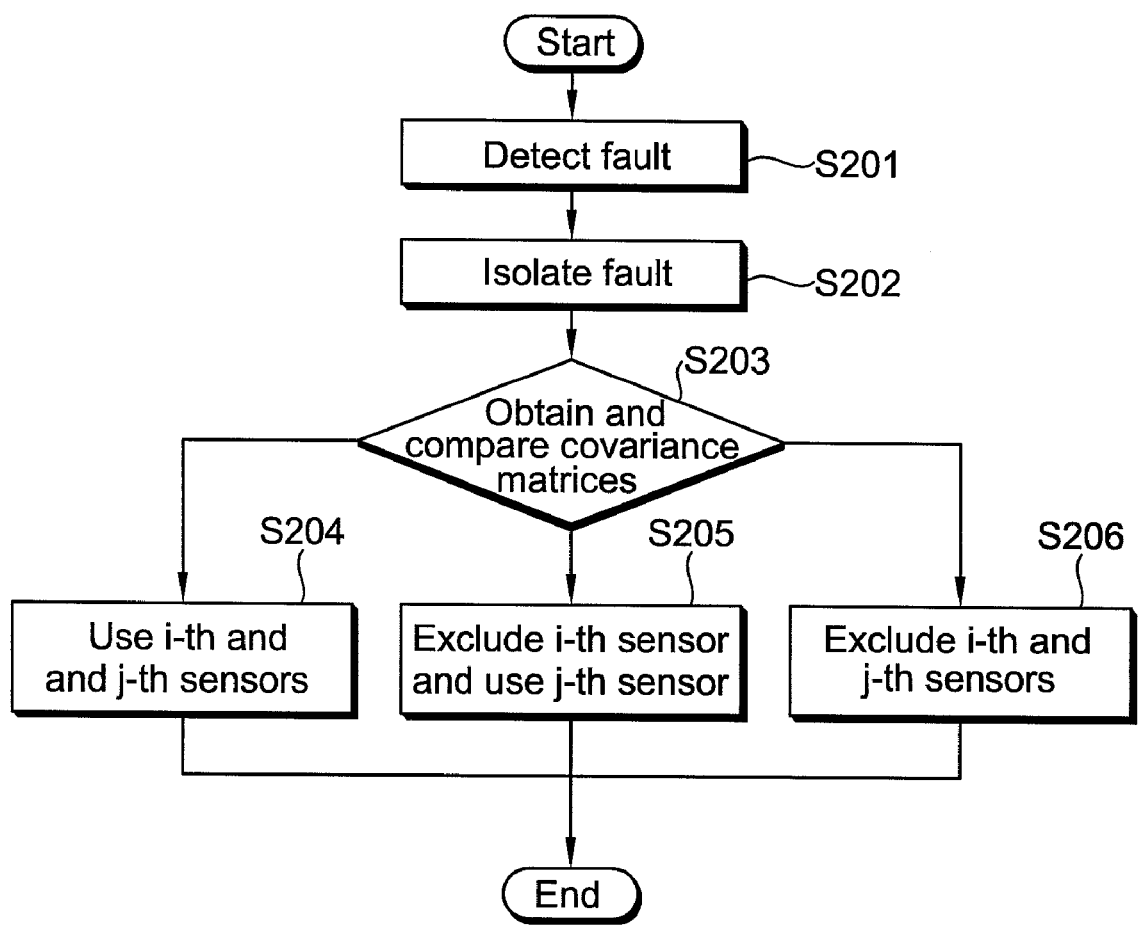
FIG. 10 is a flow chart illustrating a method of accommodating fault in sensors according to an embodiment of the present invention.

FIG. 10 is a flow chart illustrating a method of accommodating fault in sensors according to an embodiment of the present invention.

A method of accommodating fault in sensors according to the present invention is used after fault detection and fault isolation are performed in advance. Therefore, hereinafter, all the description will be given under the assumption that a fault detection procedure (S201) and a fault isolation procedure (S202) are performed in advance. The fault detection procedure (S201) and the fault isolation procedure (S202) may be performed using the fault detection and isolation method described above.

The fault accommodation procedure is performed by selectively determining a sensor to be excluded among faulty sensors. To do this, first, a covariance matrix is calculated, and then respective covariance matrices are compared (S203).

The covariance matrix can be obtained by calculating the covariance of $\hat{x}(t)$ that is a triad solution of Equation 13 the is the same as Equation 1:

$$m = Hx + f + \epsilon, \epsilon \sim N(0_n, \sigma I_n) \quad \text{[Equation 13]}$$

Figure 11:
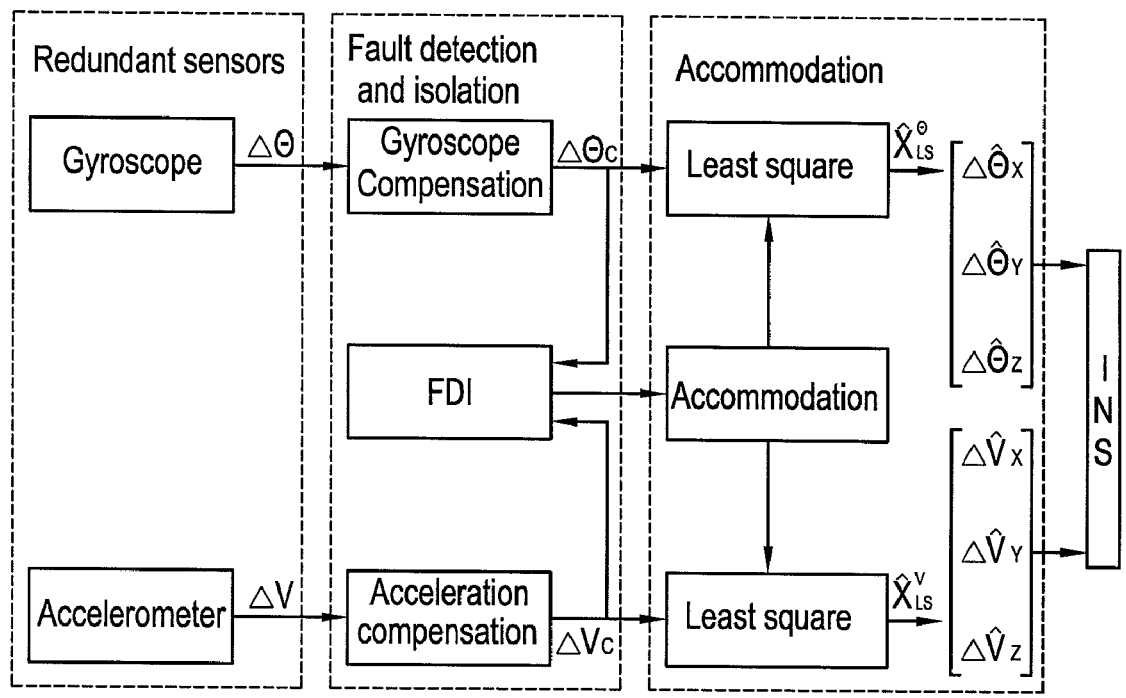
FIG. 11 is a flow chart illustrating fault detection, isolation, and accommodation procedures for inertial navigation systems (INS) using redundant sensors.

FIG. 11 illustrates triad solution of Equation 13, that is, $\hat{x} = [\hat{x}_x \, \hat{x}_y \, \hat{x}_z]^T$. The triad solution is acceleration or angular rate and can be obtained using least square method as follows:

$$\hat{x}(t) = (H^T H)^{-1} H^T m(t) \quad \text{[Equation 14]}$$

The estimation error of x(t) is defined as $e(t) = \hat{x}(t) - x(t)$. Navigation solution such as position, velocity, and attitude is calculated from $\hat{x}(t)$. Thus, the navigation accuracy of INS depends on the error covariance $C(t) = E[e(t)e(t)^T]$.

Then, two matrices $C_{+i}(t)$ and $C_{-i}(t)$ given by Equations 15 and 16 are taken into consideration:

$$C_{+i}(t) = f(t)^2 (H^T H)^{-1} h_i h_i^T (H^T H)^{-1} + \sigma^2 (H^T H)^{-1} \quad \text{[Equation 15]}$$

$$C_{-i}(t) = E[(\hat{x}_{-i}(t) - x(t))(\hat{x}_{-i}(t) - x(t))^T] \quad \text{[Equation 16]}$$
$$= \sigma^2 (H^T W_i H)^{-1}$$

In Equations 15 and 16, $C_{+I}$ and $C_{-I}$ denotes the covariance of $\hat{x}$ including and excluding the i-th sensor, respectively, and $W_i$ is a n×n diagonal matrix with (i, i) component set to 0 and the other components set to 1.

If i-th sensor has fault, the following two inequalities are equivalent, with respect to Equations 14 and 16:

$$|f(t)| \le \frac{\sigma}{\|v_i\|_2} \quad \text{[Equation 17]}$$

$$C_{+1}(t) - C_{-i}(t) \le 0 \quad \text{[Equation 18]}$$

where σ and $v_i$ are standard deviation of sensor noise and i-th column of V matrix, which satisfies $V = [V_1, V_2, \ldots, V_n]$ and $|v_i| = 1 (i = 1, \ldots, n)$. Also $$|f(t)| = \frac{\sigma}{\|v_i\|_2} \Leftrightarrow C_{+i}(t) = C_{-i}(t).$$

That is, when the magnitude of i-th fault is less than $\sigma/\|v_i\|_2$, the error covariance of estimate $\hat{x}$ including i-th sensor is less than the error covariance of estimate $\hat{x}$ excluding it, thus the i-th faulty sensor should be used despite of its fault to improve the navigation accuracy. Therefore, the exclusion threshold $\sigma/\|v_i\|_2$ can be used as an accommodation rule.

An accommodation rule for double faults in redundant sensors will now be described in detail.

First, navigation performance analysis is performed.

For Equation 1, it is supposed that double faults $f_i$ and $f_j$ occur. In this regard, the double faults means that $$f(t) = [0 \ldots f_i 0 \ldots f_j 0 \ldots ]^T.$$

To analyze the navigation performance, the covariance of $\hat{x}$ that is the triad solution of Equation 13 is calculated. The covariance matrix is defined as follows.

Matrix $C_{+i+j}$ denotes the covariance of $\hat{x}$ including i-th and j-th sensor outputs, and matrix $C_{-i-j}$ denotes the covariance of $\hat{x}$ excluding i-th and j-th sensor. In addition, matrix $C_{-i+j}$ denotes the covariance of $\hat{x}$ excluding i-th sensor output and including j-th sensor output, and matrix $C_{+i+j}$ denotes the covariance of $\hat{x}$ including i-th sensor output and excluding j-th sensor output.

1. Covariance Matrix $C_{+i+j}$

The error for $\hat{x}$ can be calculated as follows:

$$\hat{x}_{+i+j} - x = (H^T H)^{-1} \{f_i h_i + f_j h_j + H^T \epsilon\} \quad \text{[Equation 19]}$$

where $\hat{x}_{+i+j} = [\hat{x}_{++x} \, \hat{x}_{++y} \, \hat{x}_{++z}]^T$.

The estimation error of x can be described as the error covariance matrix $C_{+i+j}$ given by:

$$C_{+i+j} = E[(\hat{x}_{+i+j} - x)(\hat{x}_{+i+j} - x)^T] = \quad \text{[Equation 20]}$$
$$\sigma^2 (H^T H)^{-1} + (H^T H)^{-1} [h_i h_j] \begin{bmatrix} f_i^2 & f_i f_j \\ f_i f_j & f_j^2 \end{bmatrix} \begin{bmatrix} h_i^T \\ h_j^T \end{bmatrix} (H^T H)^{-1}$$

2. Covariance Matrix $C_{-i-j}$.

The error for $\hat{x}$ can be calculated as follows:

$$\hat{x}_{-i-j} - x = (H^T W_{ij} H)^{-1} H^T W_{ij} \epsilon \qquad \text{[Equation 21]}$$

where $\hat{x}_{-i-j} = [\hat{x}_{--x} \ \hat{x}_{--y} \ \hat{x}_{--z}]^T$ and $W_{ij}$ is a diagonal matrix with diagonal elements of 1 with (i,i) component and (j, j) component which are set to 0 and the other component set to 1.

The estimation error of $\hat{x}$ can be described as the covariance matrix $C_{-i-j}$ given by:

$$C_{-i-j} = E[(\hat{x}_{-i-j} - x)(\hat{x}_{-i-j} - x)^T] = \sigma^2 (H^T H)^{-1} + \qquad \text{[Equation 22]}$$

$$\frac{\sigma^2}{D_{ij}} (H^T H)^{-1} [h_i h_j] \begin{bmatrix} \|v_j\|_2^2 & -v_j^T v_i \\ -v_i^T v_j & \|v_i\|_2^2 \end{bmatrix} \begin{bmatrix} h_i^T \\ h_j^T \end{bmatrix} (H^T H)^{-1}$$

where $D_{ij} = \|v_i\|_2^2 \|v_j\|_2^2 - \langle v_i, v_j \rangle^2 = \|v_i\|_2^2 \|v_j\|_2^2 \sin^2 \theta_{ij}$ and, $\Theta_{ij}$ is the angle between two vectors $v_i$ and $v_j$ which are column vectors of matrix V defined in $V = [V_1, V_2, \ldots, V_n]$ and $|v_i| = 1 (i = 1, \ldots, n)$.

3. Covariance Matrix $C_{-i+j}$

The error for $\hat{x}$ can be calculated as follows.

$$\hat{x}_{-i+j} - x = (H^T W_i H)^{-1} H^T W_i (V_{Fj} f_j + \epsilon) \qquad \text{[Equation 23]}$$

where $\hat{x}_{-i+j} = [\hat{x}_{-+x} \ \hat{x}_{-+y} \ \hat{x}_{-+z}]^T$ and, $V_{Fj} = [0 \ldots 0 \ 1 \ 0 \ldots 0]^T \in R^{n \times 1}$ with j-th component of 1, which results in $H^T W_i V_{Fj} = h_j$.

The estimation error of $\hat{x}$ can be denoted by the error covariance matrix $C_{-i+j}$ given by:

$$C_{-i+j} = f_j^2 (H^T W_i H)^{-1} h_j h_j^T (H^T W_i H)^{-1} + \qquad \text{[Equation 24]}$$

$$\sigma^2 (H^T W_i H)^{-1}$$

$$= f_j^2 (H^T W_i H)^{-1} h_j h_j^T (H^T W_i H)^{-1} +$$

$$\sigma^2 (H^T H)^{-1} + \frac{\sigma^2}{\|v_i\|_2^2} (H^T H)^{-1} h_i h_i^T (H^T H)^{-1}$$

Herein, three theorems which provide accommodation rules for double faults can be obtained from the result of navigation performance analysis described above.

Theorem 1

The measurement equation given by Equation 1 and the triad solution given by Equation 14 are considered and it is supposed that i-th and j-th sensors have fault. For the two estimation error covariance matrices given by Equations 20 and 22, the following two inequalities are equivalent.

$$tr(C_{+i+j}) < tr(C_{-i-j}) \qquad \text{[Equation 25]}$$

where tr denotes the trace of a matrix.

$$f_i^2 \|(H^T H)^{-1} h_i\|_2^2 + f_j^2 \|(H^T H)^{-1} h_j\|_2^2 + 2 f_i f_j \langle (H^T H)^{-1} h_i, (H^T H)^{-1} h_j \rangle < \zeta_1 \qquad \text{[Equation 26]}$$

where $\langle , \rangle$ denotes an inner product, $\gamma = 2(H^T H)^{-1} h_i, (H^T H)^{-1} h_j \rangle \langle v_i, v_j \rangle$, and $$\zeta_1 = \sigma^2 \frac{\|(H^T H)^{-1} h_i\|_2^2 \|v_j\|_2^2 + \|(H^T H)^{-1} h_j\|_2^2 \|v_i\|_2^2 - \gamma}{D_{ij}}.$$

Theorem 1 is proved as follows.

First, $tr(C_{+i+j}) = E[(\hat{x}_{++x} - x_x)^2] + E[(\hat{x}_{++y} - x_y)^2] + E[(\hat{x}_{++z} - x_z)^2]$ and $tr(C_{-i-j}) = E[(\hat{x}_{--x} - x_x)^2] + E[(\hat{x}_{--y} - x_y)^2] + E[(\hat{x}_{--z} - x_z)^2]$ are given, and matrices A and B are given by:

$$A = \begin{bmatrix} h_i^T \\ h_j^T \end{bmatrix} (H^T H)^{-1} (H^T H)^{-1} [h_i h_j] \qquad \text{[Equation 27]}$$

$$= \begin{bmatrix} \|(H^T H)^{-1} h_i\|_2^2 & \langle (H^T H)^{-1} h_i, (H^T H)^{-1} h_j \rangle \\ \langle (H^T H)^{-1} h_i, (H^T H)^{-1} h_j \rangle & \|(H^T H)^{-1} h_j\|_2^2 \end{bmatrix}$$

$$B = \begin{bmatrix} f_i^2 - \frac{\sigma^2 \|v_j\|_2^2}{D_{ij}} & f_i f_j + \frac{\sigma^2 v_j^T v_i}{D_{ij}} \\ f_i f_j + \frac{\sigma^2 v_i^T v_j}{D_{ij}} & f_j^2 - \frac{\sigma^2 \|v_i\|_2^2}{D_{ij}} \end{bmatrix} \qquad \text{[Equation 28]}$$

Then, $tr(C_{+i+j} - C_{-i-j}) = tr(AB) < 0$ gives the following inequality with long manipulation.

$$f_i^2 \|(H^T H)^{-1} h_i\|_2^2 + f_j^2 \|(H^T H)^{-1} h_j\|_2^2 + 2 f_i f_j \langle (H^T H)^{-1} h_i, \qquad \text{[Equation 29]}$$

$$(H^T H)^{-1} h_j \rangle < \sigma^2 \frac{\|(H^T H)^{-1} h_i\|_2^2 \|v_j\|_2^2 + \|(H^T H)^{-1} h_j\|_2^2 \|v_i\|_2^2 - \gamma}{D_{ij}}$$

Theorem 1 means that if faults $f_i$ and $f_j$ occur and the magnitudes of the two faults located inside an ellipse in Equation 21, corresponding faulty sensors should not be excluded to obtain less estimation error by using them.

Theorem 2

The measurement equation given by Equation 1 and the triad solution given by Equation 14 are considered and it is supposed that i-th and j-th sensors have fault. For the two estimation error covariance matrices given by Equations 22 and 24, the following two inequalities are equivalent.

$$tr(C_{-i+j}) < tr(C_{-i-j}) \qquad \text{[Equation 30]}$$

-continued $$f_j^2 < \zeta_2 \quad \text{[Equation 31]}$$

where, $$\zeta_2 = \frac{tr(A)}{tr(B)},$$

$$A = \sigma^2 (H^T H)^{-1}$$

$$\left\{ \frac{1}{D_{ij}} [h_i \; h_j] \begin{bmatrix} \|v_j\|_2^2 & -v_j^T v_i \\ -v_i^T v_j & \|v_i\|_2^2 \end{bmatrix} \begin{bmatrix} h_i^T \\ h_j^T \end{bmatrix} - \frac{1}{\|v_i\|_2^2} h_i h_i^T \right\} (H^T H)^{-1},$$

and $$B = (H^T W_i H)^{-1} h_j h_j^T (H^T W_i H)^{-1}.$$

Theorem 2 can be proved in the same manner as in Theorem 1.

Theorem 2 means that even though faults $f_i$ and $f_j$ are located outside the ellipse in Equation 25 and satisfy $|f_j| < |f_i|$, if Equation 31 is satisfied, the j-th sensor should not be excluded since less estimation error can be obtained by using the j-th sensor.

Theorem 3

The measurement equation given by Equation 1 and the triad solution given by Equation 14 are considered and it is supposed that i-th and j-th sensors have fault. For the two estimation error covariance matrices given by Equation 20 and 24, the following two inequalities are equivalent:

$$tr(C_{-i+j}) < tr(C_{+i+j}) \quad \text{[Equation 32]}$$

$$f_i^2 + f_j^2 \frac{\{\|(H^T H)^{-1} h_j\|_2^2 - \|(H^T W_i H)^{-1} h_j\|_2^2\}}{\|(H^T H)^{-1} h_i\|_2^2} + \frac{2 f_i f_j < (H^T H)^{-1} h_i, (H^T H)^{-1} h_j >}{\|(H^T H)^{-1} h_i\|_2^2} > \frac{\sigma^2}{\|v_i\|_2^2} \quad \text{[Equation 33]}$$

Theorem 3 can be proved as follows.

From Equations 20 and 24, $tr(C_{-i+j})$ and $tr(C_{+i+j})$ can be calculated as follows:

$$tr(C_{-i+j}) = f_j^2 \|(H^T W_i H)^{-1} h_j\|_2^2 + \quad \text{[Equation 34]}$$
$$\sigma^2 tr((H^T H)^{-1}) + \frac{\sigma^2}{\|v_i\|_2^2} \|(H^T H)^{-1} h_i\|_2^2$$

$$tr(C_{+i+j}) = f_i^2 \|(H^T H)^{-1} h_i\|_2^2 + f_j^2 \|(H^T H)^{-1} h_j\|_2^2 + 2 f_i f_j < \quad \text{[Equation 35]}$$
$$(H^T H)^{-1} h_i, (H^T H)^{-1} h_j > + \sigma^2 tr((H^T H)^{-1})$$

By calculating $tr(C_{-i+j}) - tr(C_{+1+j}) < 0$, Equation 28 can be obtained.

Theorem 3 means that even though faults $f_i$ and $f_j$ are located inside the ellipse in Equation 26 and satisfy $|f_j| < |f_i|$, if Equation 33 is satisfied, i-th sensor should not be excluded since less estimation error can be obtained by excluding i-th sensor.

According to the results of Theorem 2 through Theorem 4, double faults can be categorized into four groups.

Group I: When double faults satisfy the following three inequalities:

i) $f_i^2 \|(H^T H)^{-1} h_i\|_2^2 + f_j^2 \|(H^T H)^{-1} h_j\|_2^2 + 2 f_i f_j < (H^T H)^{-1} h_i,$
$(H^T H)^{-1} h_j > < \zeta_1$ ii) $f_i^2 + f_j^2 \frac{\{\|(H^T H)^{-1} h_j\|_2^2 - \|(H^T W_i H)^{-1} h_j\|_2^2\}}{\|(H^T H)^{-1} h_i\|_2^2} + \frac{2 f_i f_j < (H^T H)^{-1} h_i, (H^T H)^{-1} h_j >}{\|(H^T H)^{-1} h_i\|_2^2} < \frac{\sigma^2}{\|v_i\|_2^2}$ iii) $|f_j| < |f_i|$.

When double faults belong to Group I, two faulty sensors should not be excluded (S204).

Group II: When double faults satisfy the following three inequalities:

i) $f_i^2 \|(H^T H)^{-1} h_i\|_2^2 + f_j^2 \|(H^T H)^{-1} h_j\|_2^2 + 2 f_i f_j < (H^T H)^{-1} h_i,$
$(H^T H)^{-1} h_j > < \zeta_1$ ii) $f_i^2 + f_j^2 \frac{\{\|(H^T H)^{-1} h_j\|_2^2 - \|(H^T W_i H)^{-1} h_j\|_2^2\}}{\|(H^T H)^{-1} h_i\|_2^2} + \frac{2 f_i f_j < (H^T H)^{-1} h_i, (H^T H)^{-1} h_j >}{\|(H^T H)^{-1} h_i\|_2^2} \geq \frac{\sigma^2}{\|v_i\|_2^2}$ iii) $|f_j| < |f_i|$.

When double faults belong to Group II, i-th sensor should be excluded but j-th sensor should not be excluded (S205).

Group III: When double faults satisfy the following three inequalities:

$f_i^2 \|(H^T H)^{-1} h_i\|_2^2 + f_j^2 \|(H^T H)^{-1} h_j\|_2^2 + 2 f_i f_j < (H^T H)^{-1} h_i,$
$(H^T H)^{-1} h_j > \geq \zeta_1$     i)

$f_j^2 < \zeta_2$     ii)

$|f_j| < |f_i|$.     iii)

When double faults belong to Group III, i-th sensor should be excluded but j-th sensor should not be excluded (S205). That is, the double faults of Group II and the double faults of Group III are handled in the same manner.

Group IV: When double faults satisfy the following three inequalities:

$f_i^2 \|(H^T H)^{-1} h_i\|_2^2 + f_j^2 \|(H^T H)^{-1} h_j\|_2^2 + 2 f_i f_j < (H^T H)^{-1} h_i,$
$(H^T H)^{-1} h_j > \geq \zeta_1$     i)

$f_j^2 \geq \zeta_2$     ii)

$|f_j| < |f_i|$.     iii)

When double faults belong to Group IV, all of the two faulty sensors should be excluded (S206).

Groups I, II, III, and VI above are considered only in the half of the first quadrant in two dimensional space. i.e., $0 \leq \theta \leq \pi/4$. In this regard, Group II and Group III give the same result.

According to the accommodation rule for double faults described above, among faulty sensors, a sensor that is to be excluded is determined. Only sensors that are not to be excluded are re-configured and the fault accommodation is complete.

Hereinafter, an accommodation rule for double faults with coplanar configuration will be described in detail.

In order to show the decision rule for a real configuration for redundant inertial sensors, the coplanar configuration as illustrated in FIG. 3, which uses 7 identical sensors is used. In this case, the measurement matrix and parity matrix have the following relations.

$$H^T H = \frac{7}{3} I_3, \; \|h_i\|_2 = 1, \; \|v_i\|_2 = 0.7756 \; (i=1,2,\ldots,6) \quad \text{[Equation 36]}$$

Figure 12:
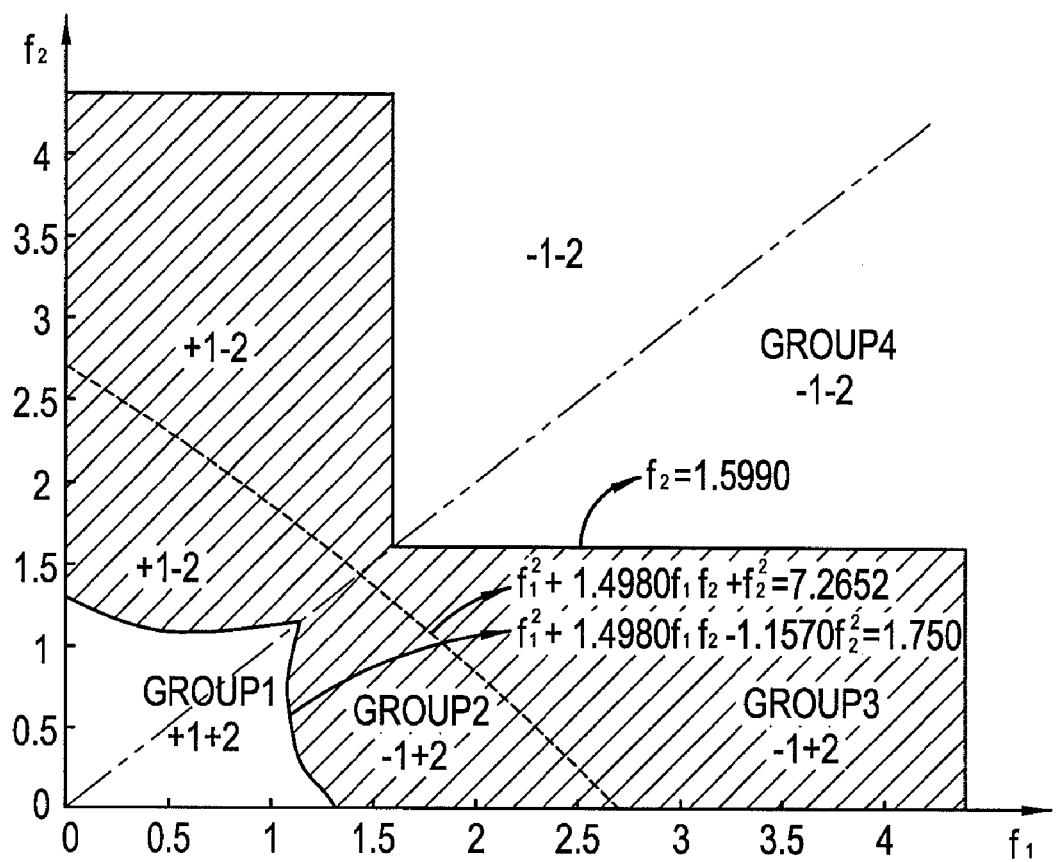
FIG. 12 is a schematic view illustrating a determination rule for excluding first and second faulty sensors among sensors configured on the same plane.
Figure 13:
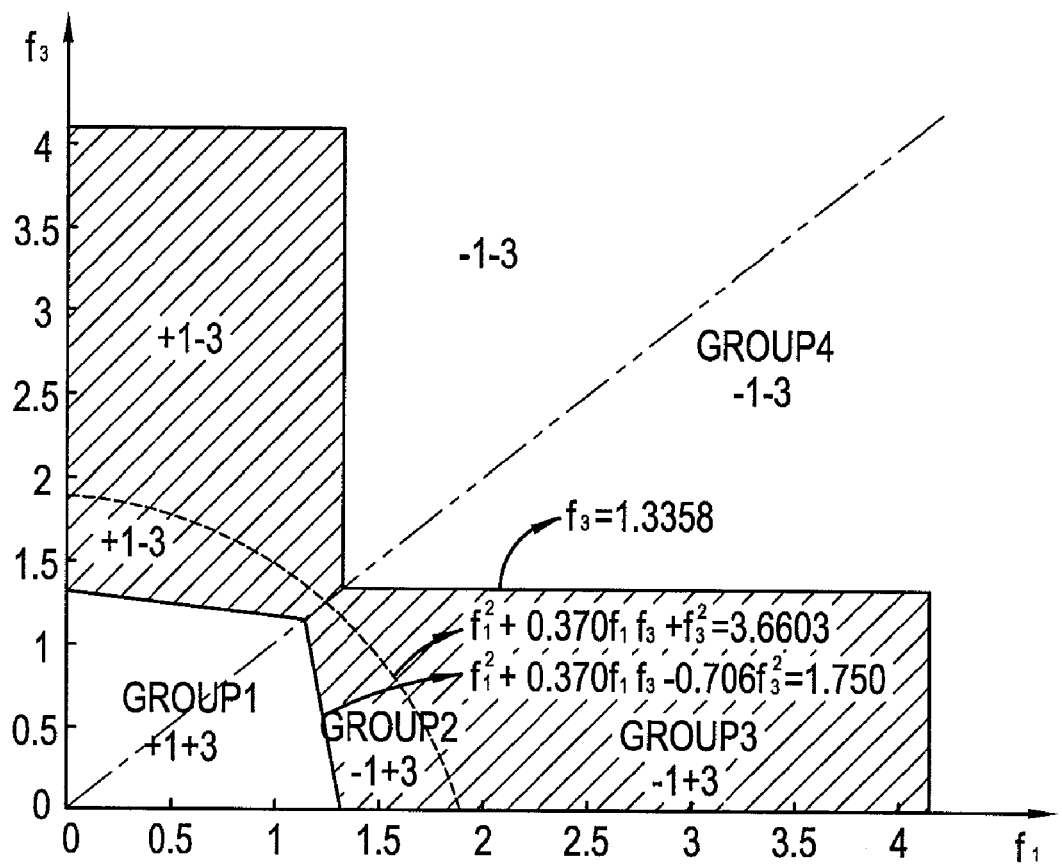
FIG. 13 is a schematic view illustrating a determination rule for excluding first and third faulty sensors among sensors configured on the same plane.
Figure 14:
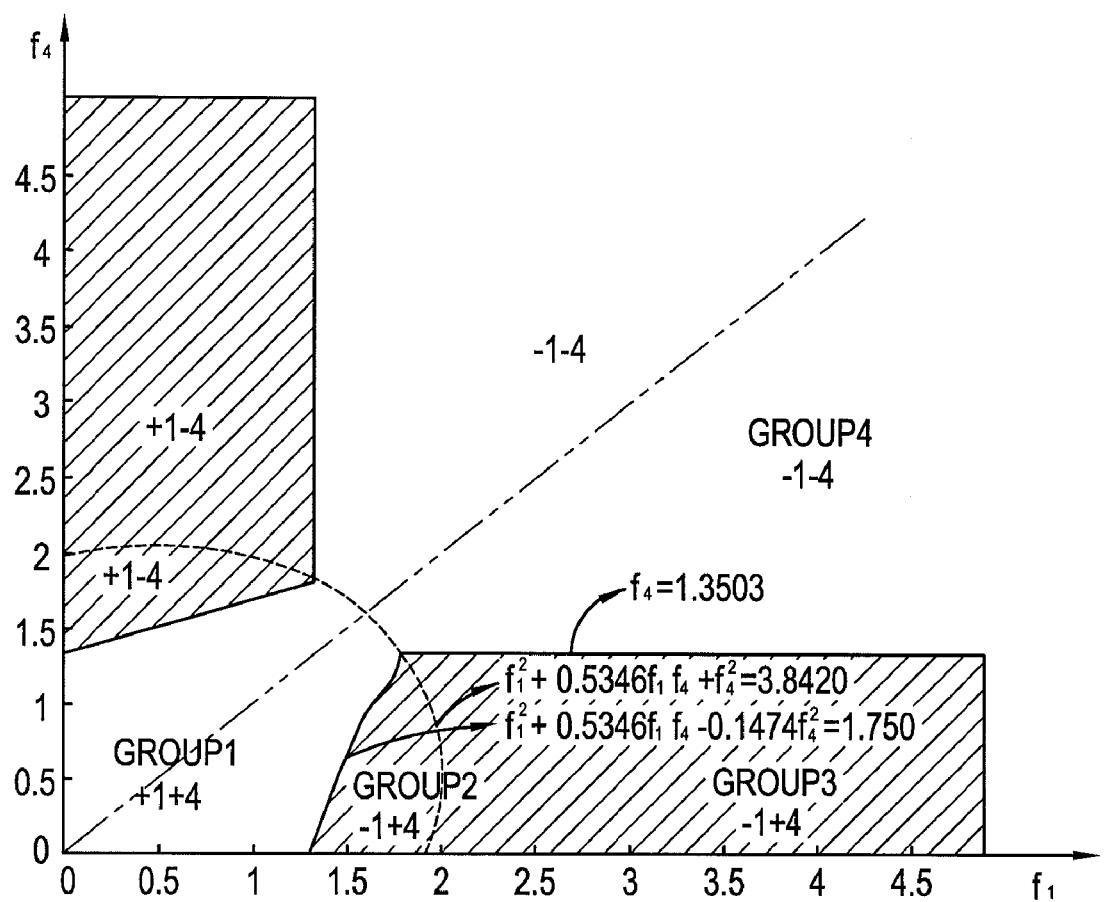
FIG. 14 is a schematic view illustrating a determination rule for excluding first and fourth faulty sensors among sensors configured on the same plane.

Tables 1-3 can be plotted in a two-dimensional plane as in FIGS. 12-14.

TABLE 1

| Group | Conditions | i-th Faulty Sensor | J-th Faulty Sensor |
|---|---|---|---|
| 1 | $f_1^2 + 1.4980 f_1 f_2 + f_2^2 < 7.2652 \sigma^2$<br>$f_1^2 - 1.1570 f_2^2 + 1.4980 f_1 f_2 < 1.750 \sigma^2$<br>$|f_2| < |f_1|$ | Use | Use |
| 2 | $f_1^2 + 1.4980 f_1 f_2 + f_2^2 < 7.2652 \sigma^2$<br>$f_1^2 - 1.1570 f_2^2 + 1.4980 f_1 f_2 \geq 1.750 \sigma^2$<br>$|f_2| < |f_1|$ | Exclusion | Use |
| 3 | $f_1^2 + 1.4980 f_1 f_2 + f_2^2 \geq 7.2652 \sigma^2$<br>$|f_2| < 1.5990 \sigma$<br>$|f_2| < |f_1|$ | Exclusion | Use |
| 4 | $f_1^2 + 1.4980 f_1 f_2 + f_2^2 \geq 7.2652 \sigma^2$<br>$|f_2| \geq 1.5990 \sigma$<br>$|f_2| < |f_1|$ | Exclusion | Exclusion |

Table 1 shows results of the four groups of double faults of first and second sensors with coplanar configuration in the region of $0 \leq \theta \leq \pi/4$, and also shows whether the faulty sensor is used or not.

TABLE 2

| Group | Conditions | i-th Faulty Sensor | j-th Faulty Sensor |
|---|---|---|---|
| 1 | $f_1^2 + 0.370 f_1 f_2 + f_3^2 < 3.6603 \sigma^2$<br>$f_1^2 - 0.0706 f_3^2 + 0.370 f_1 f_3 < 1.750 \sigma^2$<br>$|f_3| < |f_1|$ | Use | Use |
| 2 | $f_1^2 + 0.370 f_1 f_2 + f_3^2 < 3.6603 \sigma^2$<br>$f_1^2 - 0.0706 f_3^2 + 0.370 f_1 f_3 \geq 1.750 \sigma^2$<br>$|f_3| < |f_1|$ | Exclusion | Use |
| 3 | $f_1^2 + 0.370 f_1 f_2 + f_3^2 \geq 3.6603 \sigma^2$<br>$|f_3| < 1.3358 \sigma$<br>$|f_3| < |f_1|$ | Exclusion | Use |
| 4 | $f_1^2 + 0.370 f_1 f_2 + f_3^2 \geq 3.6603 \sigma^2$<br>$|f_3| \geq 1.3358 \sigma$<br>$|f_3| < |f_1|$ | Exclusion | Exclusion |

Table 2 shows results of the four groups of double faults of first and third sensors with coplanar configuration in the region of $0 \leq \theta \leq \pi/4$, and also shows whether the faulty sensor is used or not.

TABLE 3

| Group | Conditions | i-th Faulty Sensor | j-th Faulty Sensor |
|---|---|---|---|
| 1 | $f_1^2 - 0.5346 f_1 f_4 + f_4^2 < 3.8420 \sigma^2$<br>$f_1^2 - 0.1474 f_4^2 - 0.5346 f_1 f_4 < 1.750 \sigma^2$<br>$|f_4| < |f_1|$ | Use | Use |
| 2 | $f_1^2 - 0.5346 f_1 f_4 + f_4^2 < 3.8420 \sigma^2$<br>$f_1^2 - 0.1474 f_4^2 - 0.5346 f_1 f_4 \geq 1.750 \sigma^2$<br>$|f_4| < |f_1|$ | Exclusion | Use |
| 3 | $f_1^2 - 0.5346 f_1 f_4 + f_4^2 \geq 3.8420 \sigma^2$<br>$|f_4| < 1.3503 \sigma$<br>$|f_4| < |f_1|$ | Exclusion | Use |
| 4 | $f_1^2 - 0.5346 f_1 f_4 + f_4^2 \geq 3.8420 \sigma^2$<br>$|f_4| \geq 1.3503 \sigma$<br>$|f_4| < |f_1|$ | Exclusion | Exclusion |

Table 3 shows results of the four groups of double faults of first and fourth sensors with coplanar configuration in the region of $0 \leq \theta \leq \pi/4$, and also shows whether the faulty sensor is used or not.

Monte Carlo simulations are performed 10,000 times for each fault to confirm the accommodation rule for double faults case. In this regard, seven identical sensors are used with coplanar configuration as illustrated in FIG. 3.

The measurement matrices H and V satisfying VH=0 and $VV^T=I$ can be obtained as follows.

$$H = \begin{bmatrix} 0.8165 & 0 & 0.5774 \\ 0.5091 & 0.6384 & 0.5774 \\ -0.1817 & 0.7960 & 0.5774 \\ -0.7356 & 0.3543 & 0.5774 \\ -0.7356 & -0.3543 & 0.5774 \\ -0.1817 & -0.7960 & 0.5774 \\ 0.5091 & -0.6384 & 0.5774 \end{bmatrix} \quad \text{[Equation 37]}$$

where $\|v_1\|=\|v_2\|=\ldots=\|v_6\|=1/\sqrt{2}$.

Figure 15:
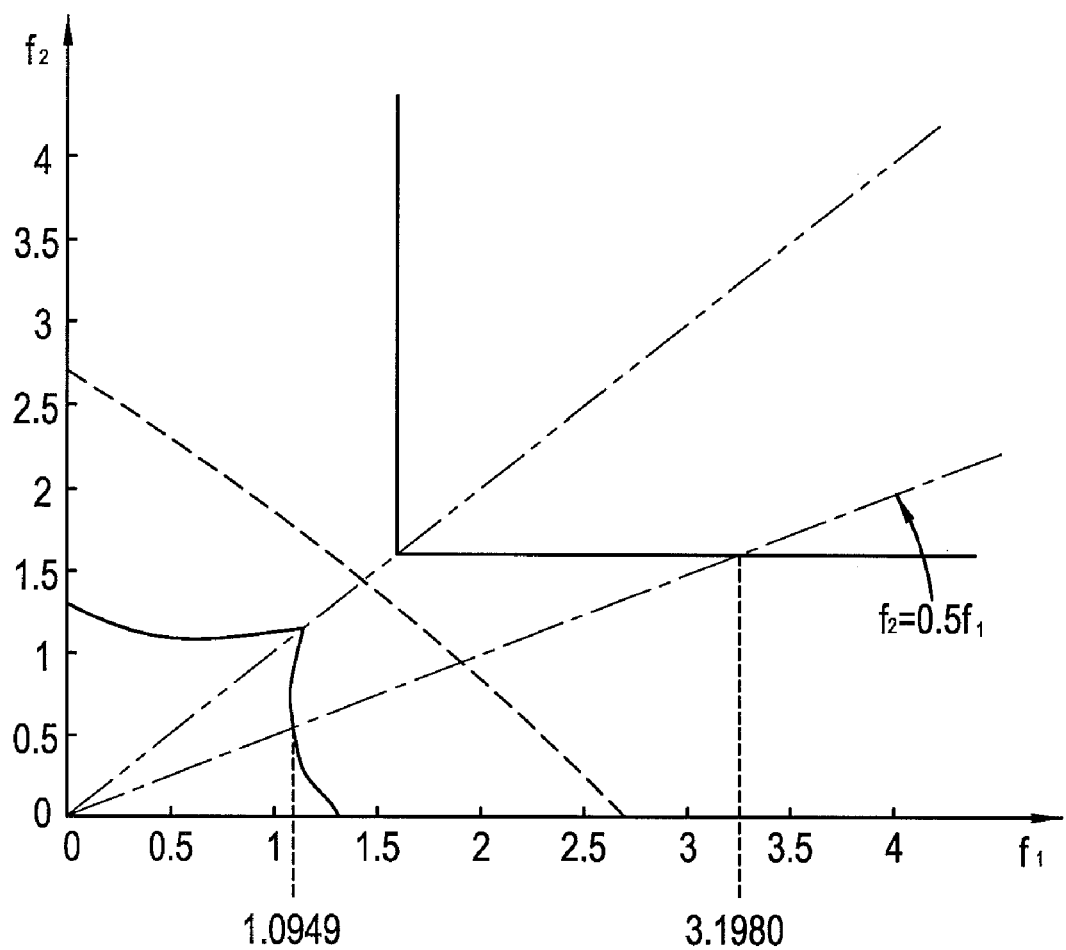
FIG. 15 is a schematic view illustrating a determination rule for excluding first and second faulty sensors and the relation of two fault magnitudes for simulation.

The first and second sensors are supposed to have fault like $f(t)=[f_1 \; f_2 \; 0 \; 0 \; 0 \; 0]^T$, and the faults $f_1$ and $f_2$ are constants and satisfy the straight line as FIG. 15. The measurement noise is white Gaussian noise with mean 0 and variance 1.

Figure 16:
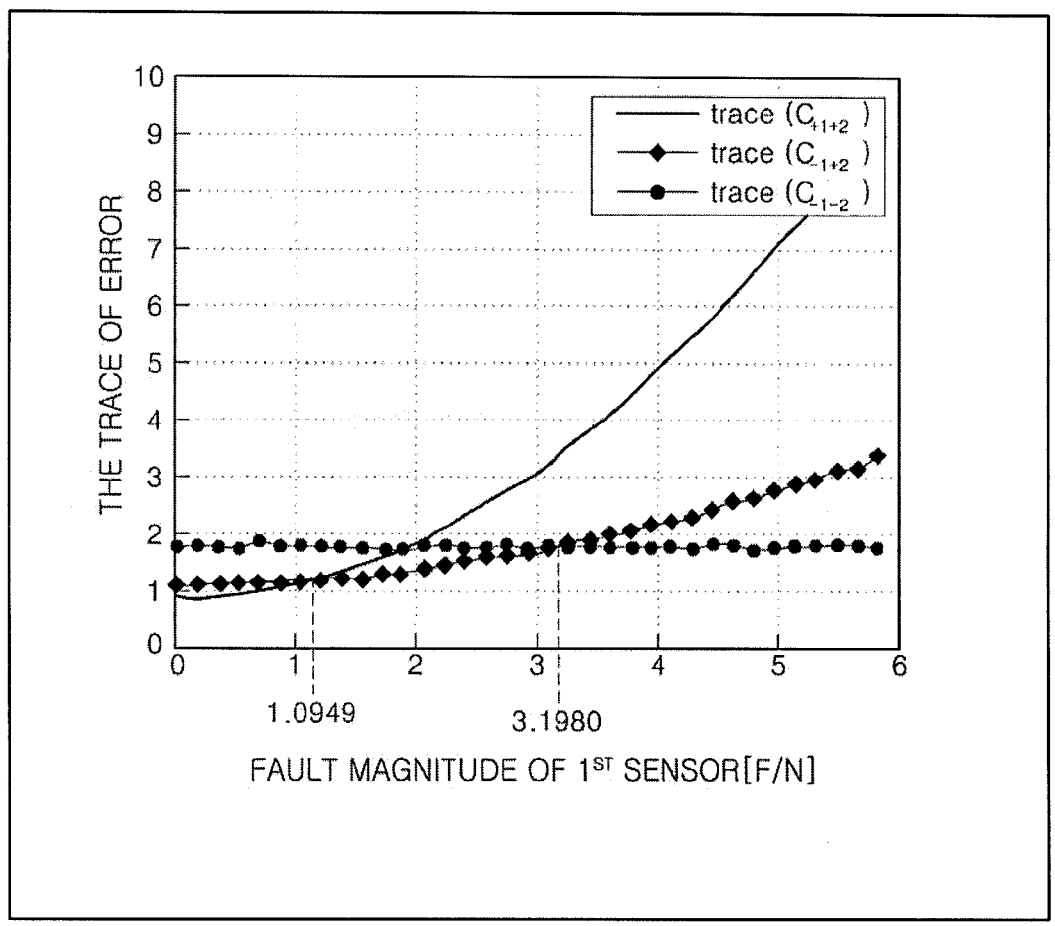
FIG. 16 shows a graph of trace($C_{+1+2}(t)$), trace($C_{-1+2}(t)$), and trace($C_{-1-2}(t)$) with respect to the magnitude of fault.

FIG. 15 illustrates a determination rule for excluding first and second faulty sensors and the relation of two fault magnitudes for simulation. FIG. 16 illustrates a graph of trace $(C_{+1+2}(t))$, trace$(C_{-1+2}(t))$, and trace$(C_{-1-2}(t))$ with respect to the magnitude of fault. When faults $f_1$ and $f_2$ belong to the region of Group I, the trace of $C_{+1+2}$ is the minimum among three traces. When faults $f_1$ and $f_2$ belong to the region of Groups II and III, the trace of $C_{-1+2}$ is the minimum. When the trace of faults $f_1$ and $f_2$ belongs to the region of Group IV, the trace of $C_{-1-2}$ is the minimum.

Figure 17:
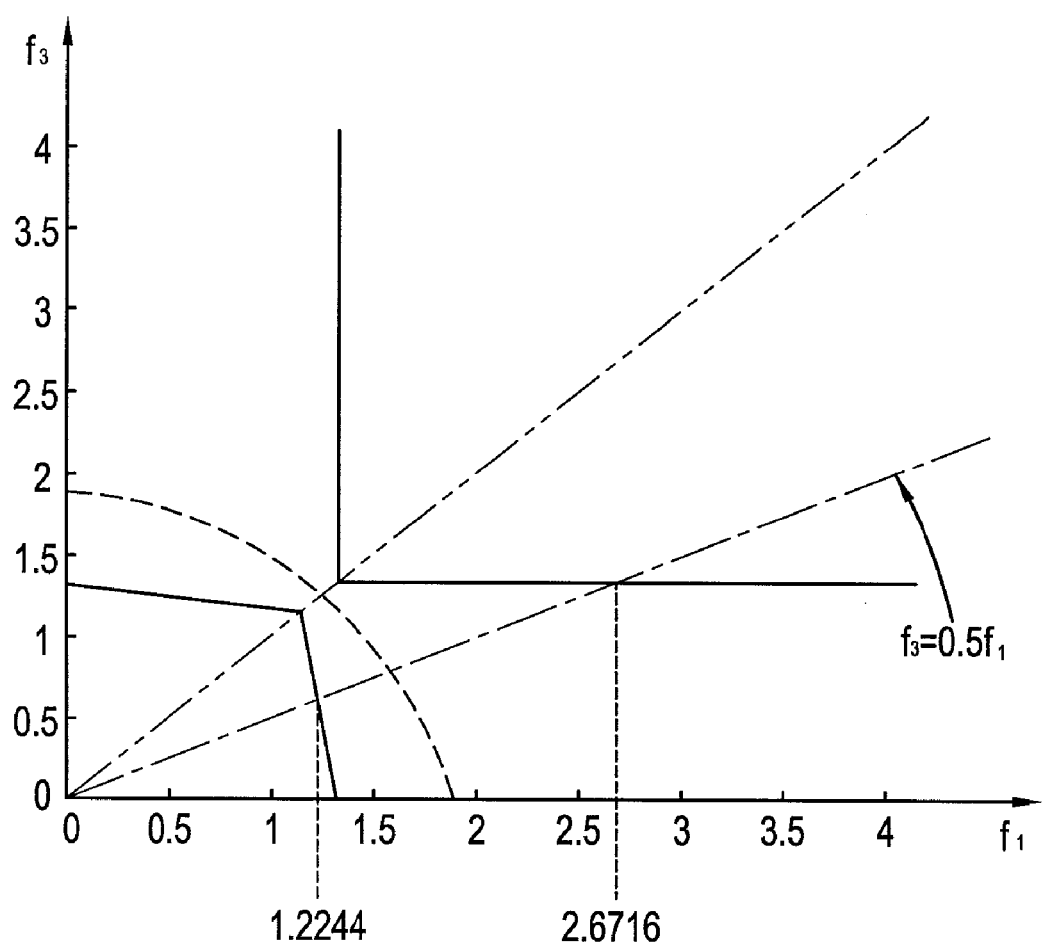
FIG. 17 is a schematic view illustrating a determination rule for excluding first and third faulty sensors and the relation of two fault magnitudes for simulation.
Figure 18:
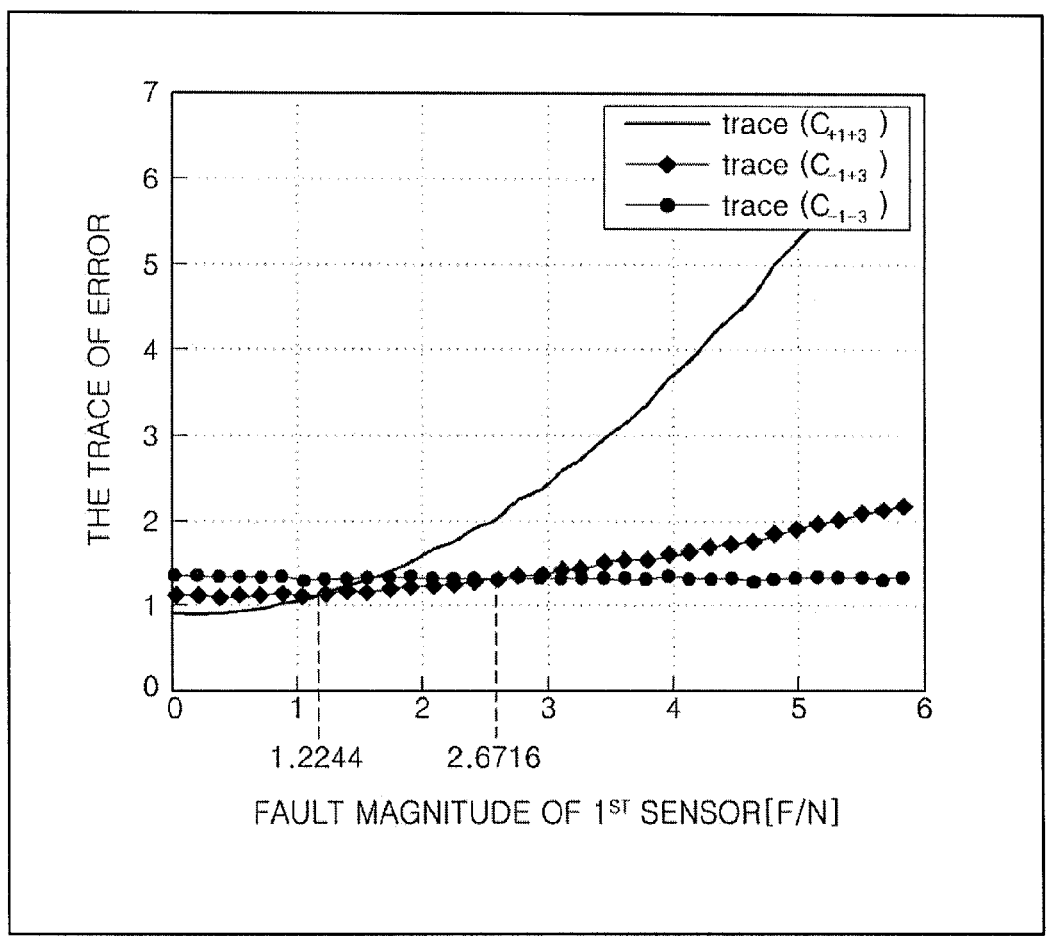
FIG. 18 shows a graph of trace($C_{+1+3}(t)$), trace($C_{-1+3}(t)$), and trace($C_{-1-3}(t)$), with respect to the magnitude of fault.
Figure 19:
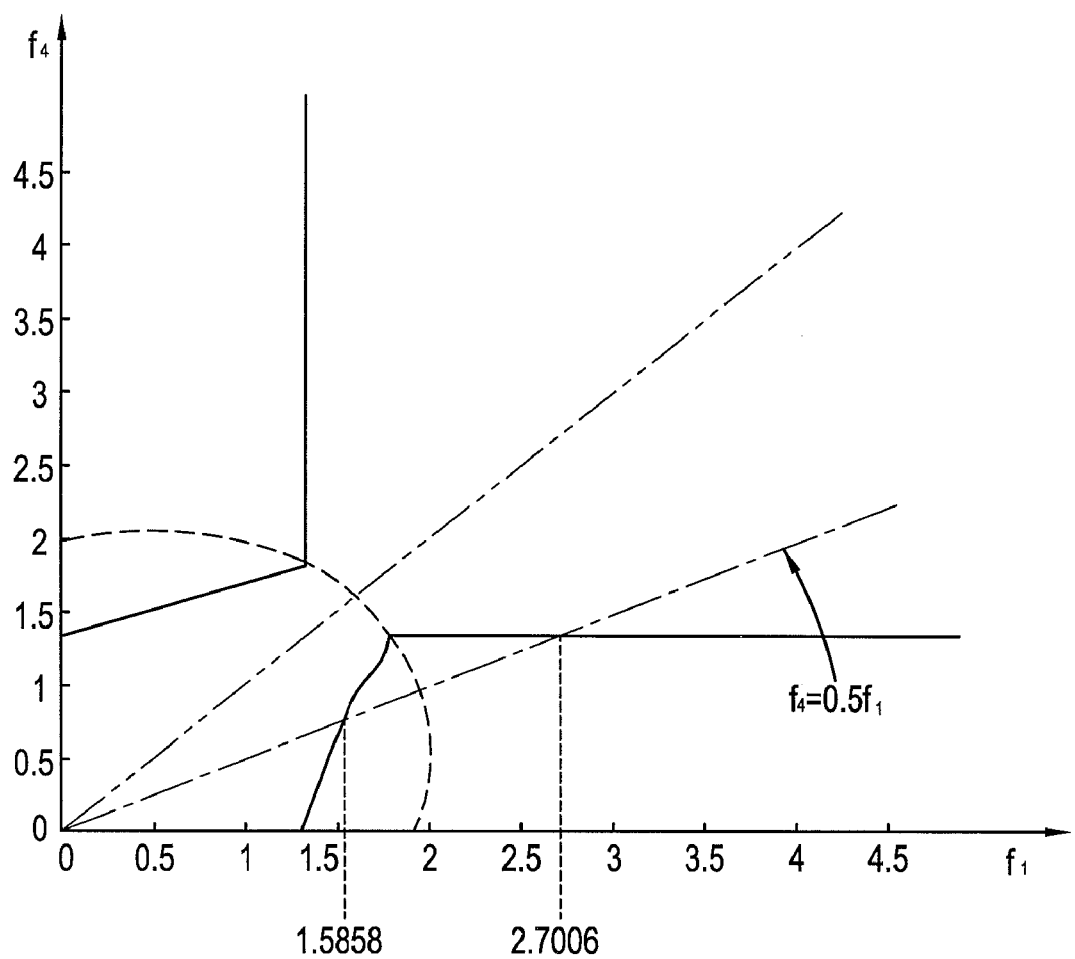
FIG. 19 is a schematic view illustrating a determination rule for excluding first and fourth faulty sensors and the relation of two fault magnitudes for simulation.
Figure 20:
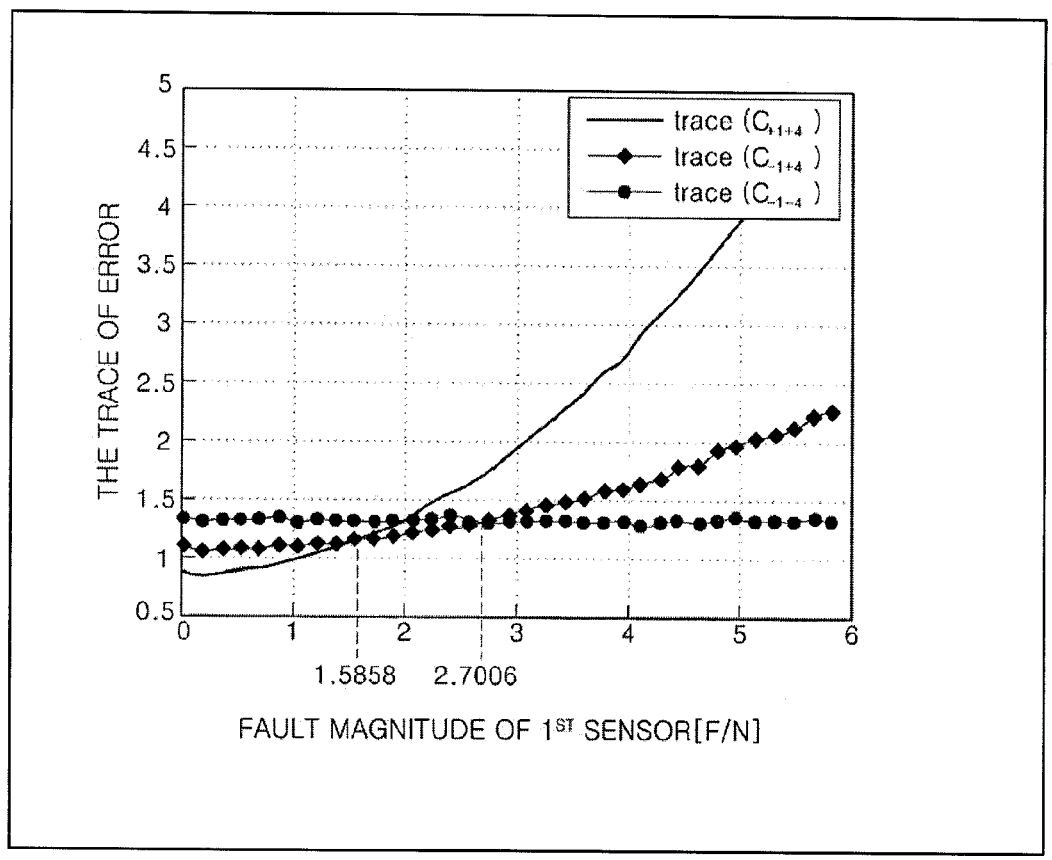
FIG. 20 shows a graph of trace($C_{+1+4}(t)$), trace($C_{-1+4}(t)$), and trace($C_{-1-4}(t)$), with respect to the magnitude of fault.

FIG. 17 is a schematic view illustrating a determination rule for excluding first and third faulty sensors and the relation of two fault magnitudes for simulation, and FIG. 18 shows a graph of trace$(C_{+1+3}(t))$, trace$(C_{-1+3}(t))$, and trace $(C_{-1-3}(t))$, with respect to the magnitude of fault. FIG. 19 is a schematic view illustrating a determination rule for excluding first and fourth faulty sensors and the relation of two fault magnitudes for simulation, and FIG. 20 shows a graph of trace$(C_{+1+4}(t))$, trace$(C_{-1+4}(t))$, and trace$(C_{-1-4}(t))$, with respect to the magnitude of fault.

As described above, the accommodation rule for double faults according to the present invention can be drawn in two-dimensional decision space, and such accommodation rule can be applied to any configurations and any number of sensors. Monte-Carlo simulation can be performed for dodecahedron configuration to confirm the improvement of the navigation accuracy for the single and double faults cases.

The present invention can also be embodied in a computer-readable code in a computer-readable recording medium. The computer-readable recording medium may be any type of recording devices that stores a computer-readable data.

Examples of the computer-readable recording medium include ROM, RAM, CD-ROM, a magnetic tape, a floppy disk, or a fiber data distribution interface. The computer-readable recording medium can also be what is embodied in a form of carrier wave, such as transmission through the Internet. Also, instead of the computer-readable recording medium, a computer-readable code which is distributed in a network computer system and can be read in a distribution manner is stored and performed.

According to the present invention, in a system including redundant sensors, faulty sensors can be accurately detected and isolated even when the magnitude of the fault signal is low. In addition, an accommodation rule is drawn in a two-dimensional decision space so that faulty sensors can be selectively excluded. Therefore, the reliability and accuracy of the whole system can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of accommodating fault in sensors, the method comprising:
    detecting fault in sensors which are each independently geometrically configured;
    when it is determined there are faulty sensors, isolating faulty sensors so that the location of the faulty sensors is identified; and
    determining sensors to be excluded among the faulty sensors by calculating a first covariance matrix comprising a plurality of faulty sensor outputs, a second covariance matrix excluding one faulty sensor output, and a third covariance matrix excluding all of the faulty sensor outputs, with respect to $\hat{x}=[\hat{x}_x\ \hat{x}_y\ \hat{x}_z]^T$ that is a triad solution of the measurement equation for n sensors $m = Hx + f + \epsilon, \epsilon \sim N(0_n, \sigma I_n)$;

and
    comparing traces of the first, second, and third covariance matrices.

2. The method of claim 1, wherein the detecting fault comprises:
    obtaining n−1 first reduced-order parity vectors by sequentially excluding one sensor output among n sensors which are each independently geometrically configured;
    obtaining $_nC_2$ cases of second reduced-order parity vectors by sequentially excluding two sensor outputs among the n sensors;
    averaging the first reduced-order parity vectors obtained at plural points of time and the second reduced-order parity vectors obtained at plural points of time to obtain an averaged first reduced-order parity vector and an averaged second reduced-order parity vector, respectively;
    obtaining a first fault detection function by multiplying the averaged first reduced-order parity vector by transpose of the averaged first reduced-order parity vector;
    obtaining a second fault detection function by multiplying the averaged second reduced-order parity vector by transpose of the averaged second reduced-order parity vector, and
    determining that at least one sensor selected from the n sensors has fault if the maximum value of the obtained first fault detection function of the n sensors is equal to or greater than a first threshold value which has been set in advance.

3. The method of claim 2, wherein the isolating fault further comprising:
    when it is determined that at least one sensor selected from the n sensors has fault, when the minimum value of the first fault detection function of the n sensors is smaller than a second threshold value which has been set in advance, determining that a single fault occur and when the minimum value of the first fault detection functions of the n sensors is equal to or greater than the second threshold value, determining that double faults occur;
    when it is determined that a single fault occurs, determining that a sensor that corresponds to a parameter of the averaged the first reduced-order parity vector that makes the first fault detection function to have the minimum value is a faulty sensor; and
    when it is determined that double faults occur, determining that a pair of sensors that correspond to a pair of parameters of the averaged second reduced-order parity vector which make the obtained $_nC_2$ cases of second fault detection function to have the minimum value are faulty sensors.

4. The method of claim 1, wherein, in the determining sensors to be excluded,
    when i-th sensor and j-th sensor are supposed to have fault and the fault vector $f_i$ of the i-th sensor and the fault vector $f_j$ of the j-th sensor satisfy three inequalities as follows, the i-th sensor and the j-th sensor are not excluded.

i) $f_i^2 \|(H^T H)^{-1} h_i\|_2^2 + f_j^2 \|(H^T H)^{-1} h_j\|_2^2 + 2 f_i f_j < (H^T H)^{-1} h_i,$ $(H^T H)^{-1} h_j > < \zeta_1$ ii) $f_i^2 + f_j^2 \frac{\{\|(H^T H)^{-1} h_j\|_2^2 - \|(H^T W_i H)^{-1} h_j\|_2^2\}}{\|(H^T H)^{-1} h_i\|_2^2} +$ $\frac{2 f_i f_j < (H^T H)^{-1} h_i, (H^T H)^{-1} h_j >}{\|(H^T H)^{-1} h_i\|_2^2} < \frac{\sigma^2}{\|v_i\|_2^2}$ iii) $|f_j| < |f_i|$ 5. The method of claim 1, wherein, in the determining sensors to be excluded,
    when i-th sensor and j-th sensor are supposed to have fault and the fault vector $f_i$ of the i-th sensor and the fault vector $f_j$ of the j-th sensor satisfy three inequalities as follows, the i-th sensor is excluded and the j-th sensor is not excluded.

i) $f_i^2 \|(H^T H)^{-1} h_i\|_2^2 + f_j^2 \|(H^T H)^{-1} h_j\|_2^2 + 2 f_i f_j < (H^T H)^{-1} h_i,$ $(H^T H)^{-1} h_j > < \zeta_1$ ii) $f_i^2 + f_j^2 \frac{\{\|(H^T H)^{-1} h_j\|_2^2 - \|(H^T W_i H)^{-1} h_j\|_2^2\}}{\|(H^T H)^{-1} h_i\|_2^2} +$ $\frac{2 f_i f_j < (H^T H)^{-1} h_i, (H^T H)^{-1} h_j >}{\|(H^T H)^{-1} h_i\|_2^2} \geq \frac{\sigma^2}{\|v_i\|_2^2}$ iii) $|f_j| < |f_i|$.

6. The method of claim 1, wherein, in the determining sensors to be excluded,
    when i-th sensor and j-th sensor are supposed to have faulty and the fault vector $f_i$ of the i-th sensor and the fault vector $f_j$ of the j-th sensor satisfy three inequalities as follows, the i-th sensor is excluded and the j-th sensor is not excluded $f_i^2\|(H^TH)^{-1}h_i\|_2^2+f_j^2\|(H^TH)^{-1}h_j\|_2^2+2f_if_j<(H^TH)^{-1}h_i,(H^TH)^{-1}h_j>\geq\zeta_1$  i)

$f_j^2<\zeta_2$  ii)

$|f_j|<|f_i|$  iii).

7. The method of claim 1, wherein, in the determining sensors to be excluded, when i-th sensor and j-th sensor are supposed to have faulty and the fault vector $f_i$ of the i-th sensor and the fault vector $f_j$ of the j-th sensor satisfy three inequalities as follows, the i-th sensor and the j-th sensor all are excluded $f_i^2\|(H^TH)^{-1}h_i\|_2^2+f_j^2\|(H^TH)^{-1}h_j\|_2^2+2f_if_j<(H^TH)^{-1}h_i,(H^TH)^{-1}h_j>\geq\zeta_1$  i)

$f_j^2<\zeta_2$  ii)

$|f_j|<|f_i|$  iii).

\* \* \* \* \*